(12) United States Patent
Seo et al.

(10) Patent No.: US 11,638,211 B2
(45) Date of Patent: Apr. 25, 2023

(54) METHOD FOR MONITORING PHYSICAL DOWNLINK CONTROL CHANNEL IN WIRELESS COMMUNICATION SYSTEM, AND DEVICE USING METHOD

(71) Applicant: LG Electronics Inc., Seoul (KR)

(72) Inventors: Inkwon Seo, Seoul (KR); Joonkui Ahn, Seoul (KR); Changhwan Park, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/553,443

(22) Filed: Dec. 16, 2021

(65) Prior Publication Data

US 2022/0110054 A1  Apr. 7, 2022

Related U.S. Application Data

(63) Continuation of application No. PCT/KR2020/009321, filed on Jul. 15, 2020.

(30) Foreign Application Priority Data

Jul. 15, 2019 (KR) .................. 10-2019-0085219

(51) Int. Cl.
*H04W 52/02* (2009.01)
*H04L 5/00* (2006.01)
*H04W 72/04* (2009.01)
*H04W 76/28* (2018.01)

(52) U.S. Cl.
CPC ....... *H04W 52/0216* (2013.01); *H04L 5/0053* (2013.01); *H04L 5/0094* (2013.01); *H04W 52/0212* (2013.01); *H04W 52/0229* (2013.01); *H04W 52/0235* (2013.01);
(Continued)

(58) Field of Classification Search
CPC ......... H04W 52/0216; H04W 52/0229; H04W 52/0235; H04W 76/28; H04W 52/0248; H04W 52/0212; H04W 72/042; H04L 5/0053; H04L 5/0094; Y02D 30/70
See application file for complete search history.

(56) References Cited

U.S. PATENT DOCUMENTS

2018/0255515 A1    9/2018 Hyde et al.
2020/0037396 A1*   1/2020 Islam ................... H04W 88/06

FOREIGN PATENT DOCUMENTS

KR      20190045157        5/2019
WO   WO-2020037319 A1 *  2/2020  ........ H04W 52/0229

OTHER PUBLICATIONS

LG Electronics, "Discussions on triggering adaptation of UE power consumption characteristics," R1-1900600, Presented at 3GPP TSG RAN WG1 Ad-Hoc Meeting 1901, Taipei, Taiwan, Jan. 21-25, 2019, 7 pages.

(Continued)

*Primary Examiner* — Ayanah S George
(74) *Attorney, Agent, or Firm* — Fish & Richardson P.C.

(57) ABSTRACT

A method by which a terminal monitors a physical downlink control channel (PDCCH) in a wireless communication system, and a device therefor are provided. In the method, a terminal wakes up in a DRX cycle linked with a monitoring occasion so as to monitor a PDCCH if a wake up signal (WUS) monitoring occasion does not exist in a monitoring window for allowing the terminal to monitor the WUS.

15 Claims, 31 Drawing Sheets

(52) U.S. Cl.
CPC ..... *H04W 52/0248* (2013.01); *H04W 72/042* (2013.01); *H04W 76/28* (2018.02)

(56) References Cited

OTHER PUBLICATIONS

Nokia & Nokia Shanghai Bell, "PDCCH-based power saving signal/channel," R1-1907375, Presented at 3GPP TSG RAN WG1 meeting #97, Reno, USA, May 13-May 17, 2019, 8 pages.
Samsung, "PDCCH-based power saving signal/channel," R1-1906980, Presented at 3GPP TSG RAN WG1 #97, Reno, USA, May 13-17, 2019, 12 pages.
3GPP TS 38.213 V15.6.0 (Jun. 2019), "3rd Generation Partnership Project; Technical Specification Group Radio Access Network; NR; Physical layer procedures for control (Release 15)," Jun. 2019, 107 pages.
3GPP TS 38.331 V15.6.0 (Jun. 2019), "3rd Generation Partnership Project; Technical Specification Group Radio Access Network; NR; Radio Resource Control (RRC) protocol specification (Release 15)," Jun. 2019, 519 pages.
Extended European Search Report in European Application No. 20839879.2, dated Jun. 27, 2022, 12 pages.
LG Electronics Inc., "Power saving signal linked to DRX," 3GPP TSG-RAN2#106, R2-1907655 (Revision of R2-1904663), Reno, U.S.A,, May 13-17, 2019, 3 pages.
Nokia et al., "On the RAN2 aspects on power signal/channel for wake-up," 3GPP TSG-RAN WG2 Meeting #106, R2-1906700, Reno, USA, May 13-17, 2019, 5 pages.

\* cited by examiner

METHOD FOR MONITORING PHYSICAL DOWNLINK CONTROL CHANNEL IN WIRELESS COMMUNICATION SYSTEM, AND DEVICE USING METHOD

CROSS-REFERENCE TO RELATED APPLICATIONS

Pursuant to 35 U.S.C. § 119(e), this application is a continuation of International Application PCT/KR2020/009321, with an international filing date of Jul. 15, 2020, which claims the benefit of Korean Patent Application No. 10-2019-0085219, filed on Jul. 15, 2019, the contents of which are hereby incorporated by reference herein in their entirety.

FIELD OF THE DISCLOSURE

The present disclosure relates to a method of monitoring a physical downlink control channel in a wireless communication system, and an apparatus using the method.

RELATED ART

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present disclosure for convenience. NR is also called the fifth generation (5G) system.

The improvement in performance and functions of a user equipment (UE) such as an increase in UE's display resolution, display size, processors, memories, and applications results in an increase in power consumption. It is important for the UE to reduce power consumption since power supply may be limited to a battery. This is also applied to a UE operating in NR.

One example for reducing power consumption of the UE includes a discontinuous reception (DRX) operation. The UE may need to monitor a physical downlink control channel (PDCCH) in every subframe to know whether there is data to be received. Since the UE does not always receive data in all subframes, such an operation results in unnecessary significant battery consumption. DRX is an operation for reducing the battery consumption. That is, the UE wakes up with a period of a DRX cycle to monitor a control channel (e.g., PDCCH) during a determined time (DRX on duration). If there is no PDCCH detection during the time, the UE enters a sleeping mode, i.e., a state in which a radio frequency (RF) transceiver is turned off. In the presence of the PDCCH detection during the time, a PDCCH monitoring time may be extended, and data transmission and reception may be performed based on the detected PDCCH.

Meanwhile, an additional power consumption reduction method may be introduced for such a DRX operation. For example, it may be unnecessary or inefficient for the UE to wake up every DRX cycle to monitor the PDCCH. To this end, the network may provide a signal (let's call it a wake-up signal: WUS) including information related to whether to wake up to the UE before the start of the DRX cycle, the UE may monitor the WUS on WUS monitoring occasions within the configured WUS monitoring window. The UE may perform an indicated operation in the DRX cycle based on the detected WUS.

However, in some cases, in a situation in which the UE is configured to monitor the WUS, a situation in which there is no WUS monitoring occasion within the time window for monitoring the WUS may also occur. In this case, ambiguity occurs between the UE and the network because it is not stipulated as to how the UE should operate, and unnecessary wake ups may occur or response latency may increase.

SUMMARY OF THE DISCLOSURE

The present disclosure provides a method of monitoring a physical downlink control channel in a wireless communication system, and an apparatus using the method.

In an aspect, provided is a method for monitoring a PDCCH of a UE in a wireless communication system. The method comprises receiving a configuration message informing at least one monitoring occasion for detecting a wake up signal (WUS) and monitoring the PDCCH in a next discontinuous reception (DRX)-on duration based on the at least one monitoring occasion being located before a predetermined time from a start time of the next DRX-on duration.

In another aspect, provided is a user equipment (UE) comprising a transceiver for transmitting and receiving a radio signal and a processor being operatively connected to the transceiver. The processor is configured to receive a configuration message informing at least one monitoring occasion for detecting a wake up signal (WUS) and monitor a PDCCH in a next discontinuous reception (DRX)-on duration based on the at least one monitoring occasion being located before a predetermined time from a start time of the next DRX-on duration.

In other aspects, provided is a method for transmitting a PDCCH of a base station in a wireless communication system. The method comprises transmitting a configuration message informing at least one monitoring occasion for detecting a wake up signal (WUS) and transmitting the PDCCH in a next discontinuous reception (DRX)-on duration based on the at least one monitoring occasion being located before a predetermined time from a start time of the next DRX-on duration.

In other aspects, a base station is provided. The base station comprises a transceiver for transmitting and receiving a radio signal and a processor being operatively connected to the transceiver. The processor is configured to transmit a configuration message informing at least one monitoring occasion for detecting a wake up signal (WUS) and transmit the PDCCH in a next discontinuous reception (DRX)-on duration based on the at least one monitoring occasion being located before a predetermined time from a start time of the next DRX-on duration.

In other aspects, provided is at least one computer readable medium (CRM) including instructions being executed by at least one processor. The at least one processor is configured to receive a configuration message informing at least one monitoring occasion for detecting a wake up signal (WUS) and monitor a physical downlink control channel (PDCCH) in a next discontinuous reception (DRX)-on duration when the at least one monitoring occasion is located before a predetermined time from a start time of the next DRX-on duration.

In other aspects, provided is an apparatus operating in a wireless communication system. The apparatus comprises a processor and a memory coupled with the processor. The processor is configured to receive a configuration message informing at least one monitoring occasion for detecting a wake up signal (WUS) and monitor a physical downlink control channel (PDCCH) in a next discontinuous reception (DRX)-on duration when the at least one monitoring occasion is located before a predetermined time from a start time of the next DRX-on duration.

In a situation in which the UE is set to monitor WUS, if there is no WUS monitoring occasion within the time window for monitoring WUS, the UE operation is clearly defined. That is, the UE wakes up in the next DRX on duration and performs PDCCH monitoring (from the viewpoint of a timer, it may be expressed that drx-onDuration-Timer is started). Through this, even in the above case, ambiguity does not occur between the UE and the network, unnecessary waking of the UE does not occur, and occurrence of an increase in response latency can be prevented.

BRIEF DESCRIPTION OF THE DRAWINGS

FIG. 19 shows a specific example to which FIG. 18 is applied.

DESCRIPTION OF EXEMPLARY EMBODIMENTS

Figure 1:
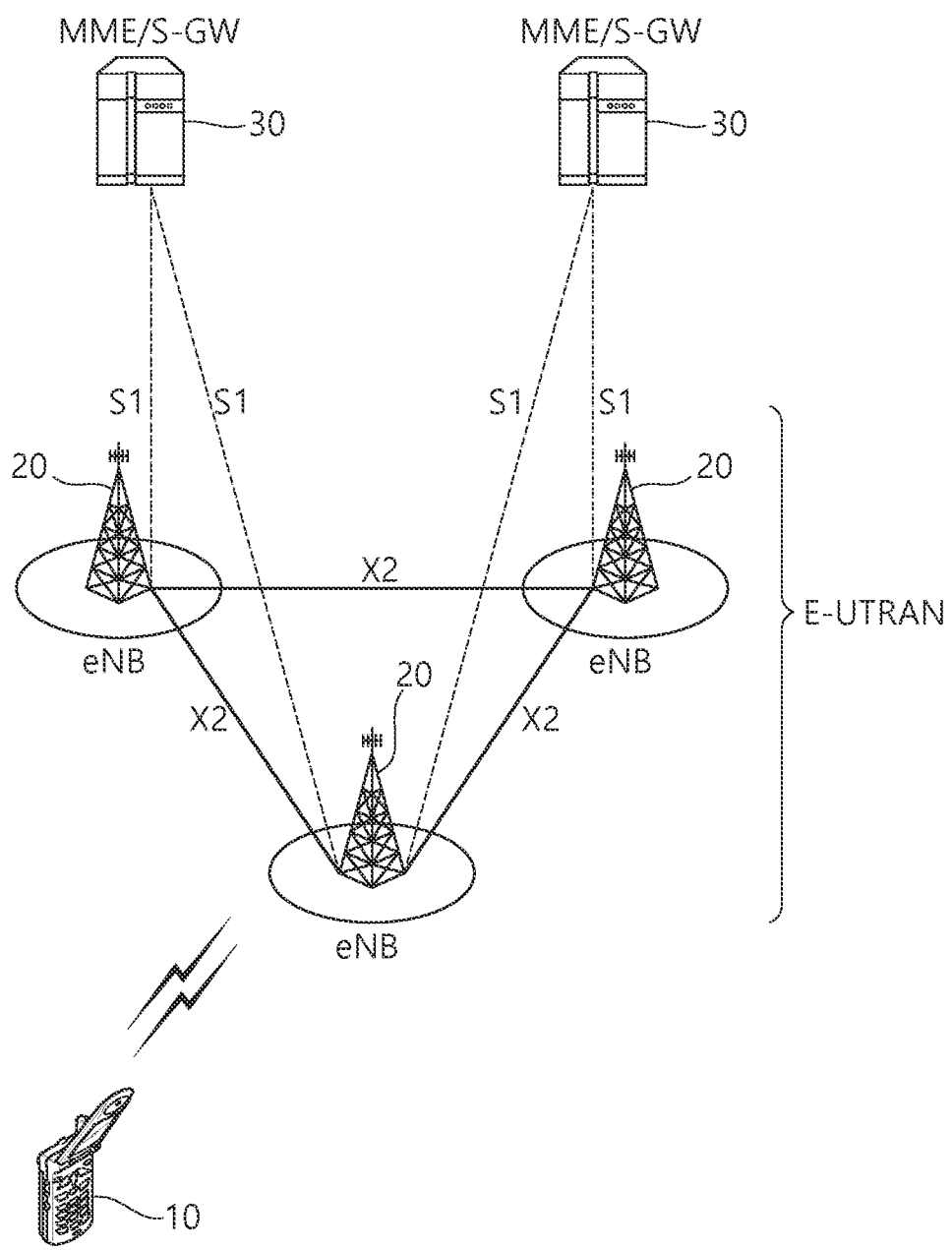
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, terminal, etc. The BS 20 is generally a fixed station that communicates with the UE 10 and may be referred to as another terminology, such as an evolved node-B (eNB), a base transceiver system (BTS), an access point, gNB, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
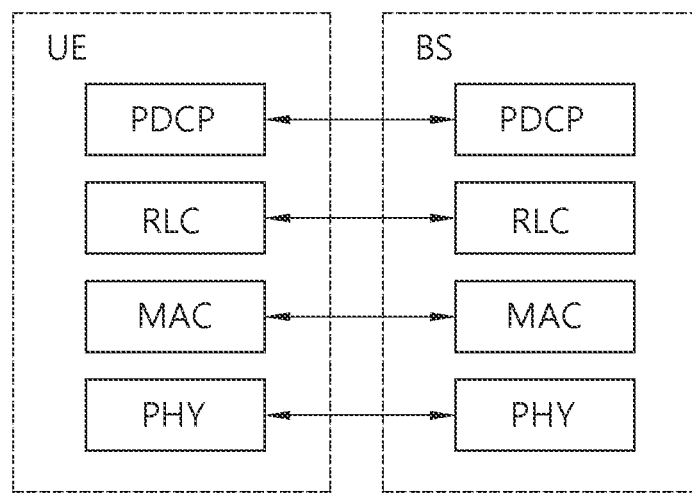
FIG. 2 is a diagram showing a wireless protocol architecture for a user plane.
Figure 3:
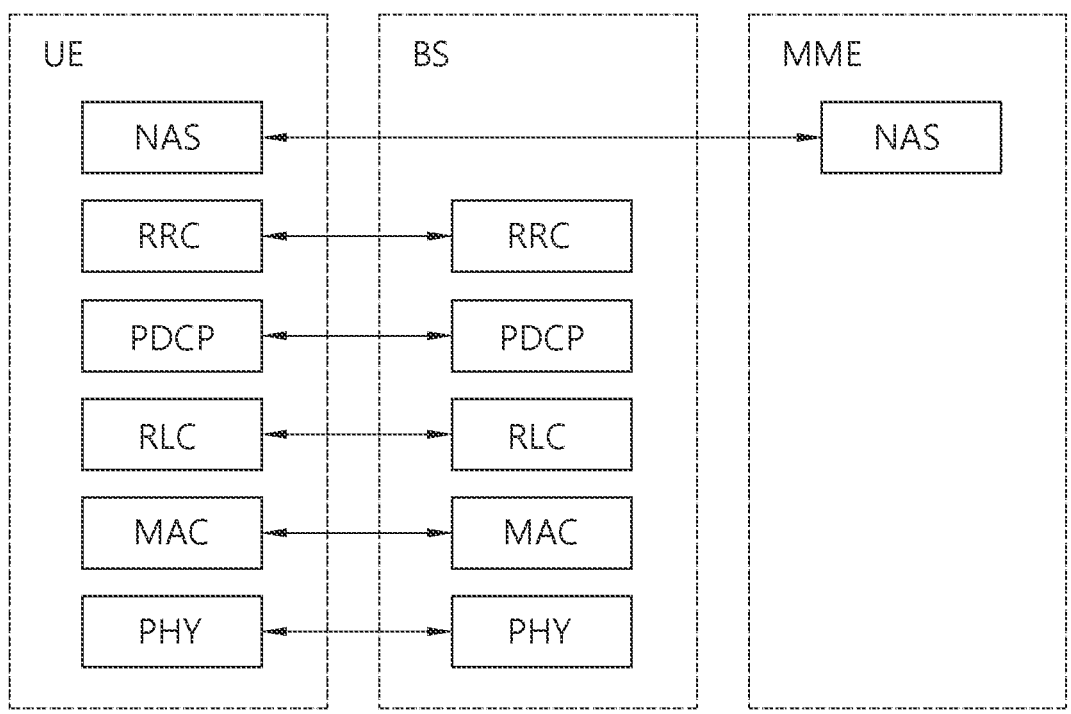
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer(=higher layer) with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
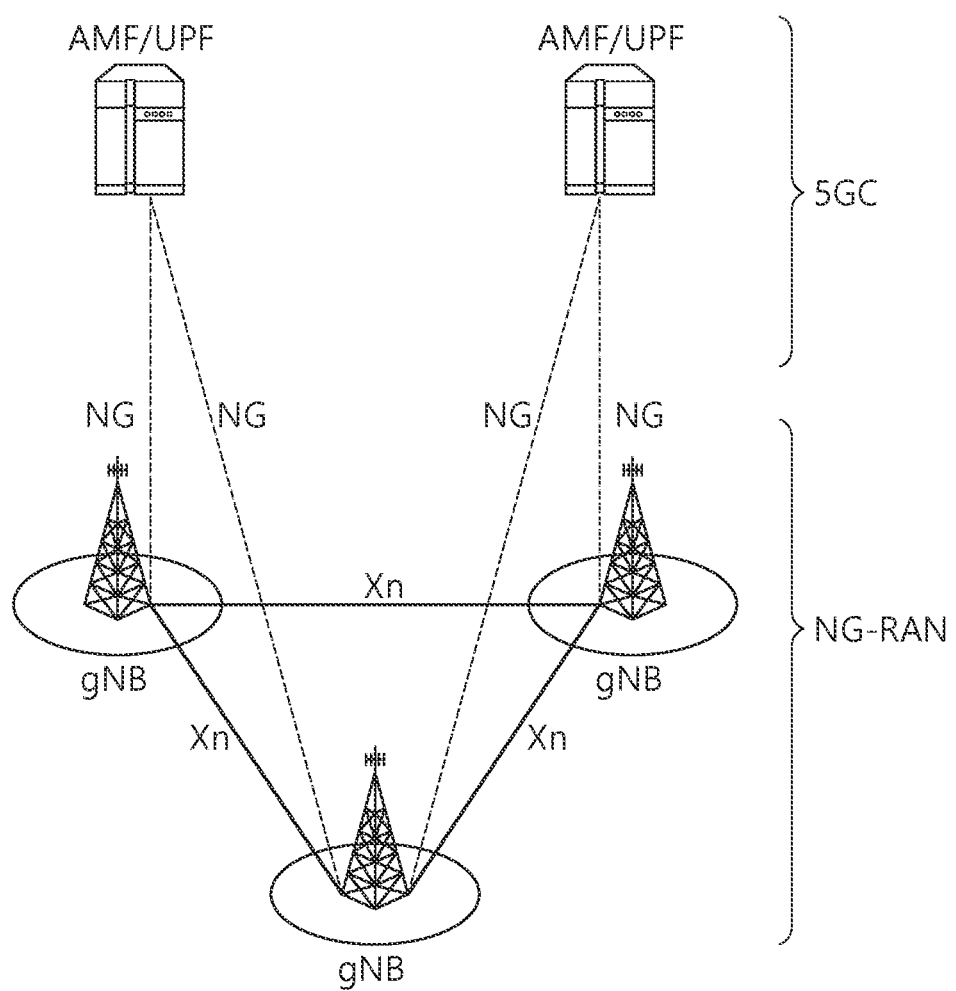
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a UE. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
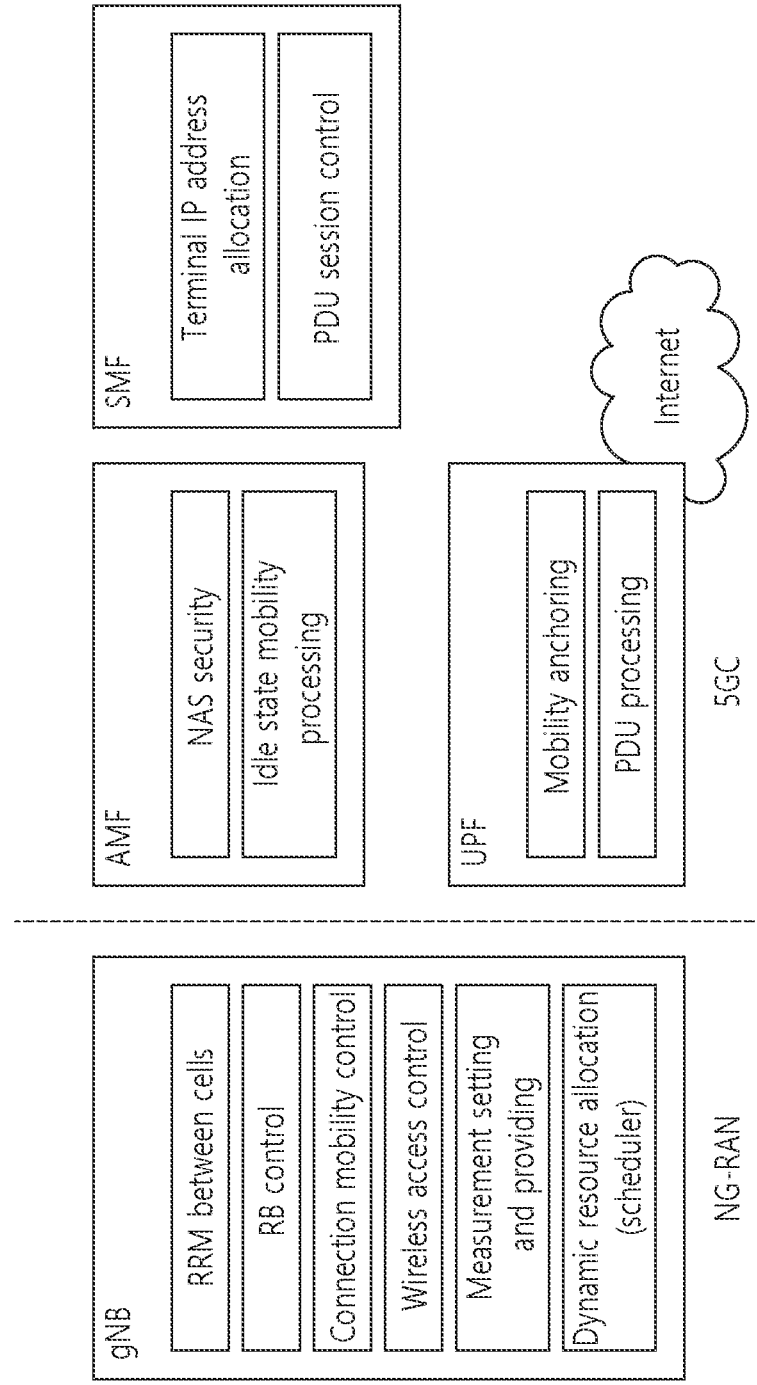
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
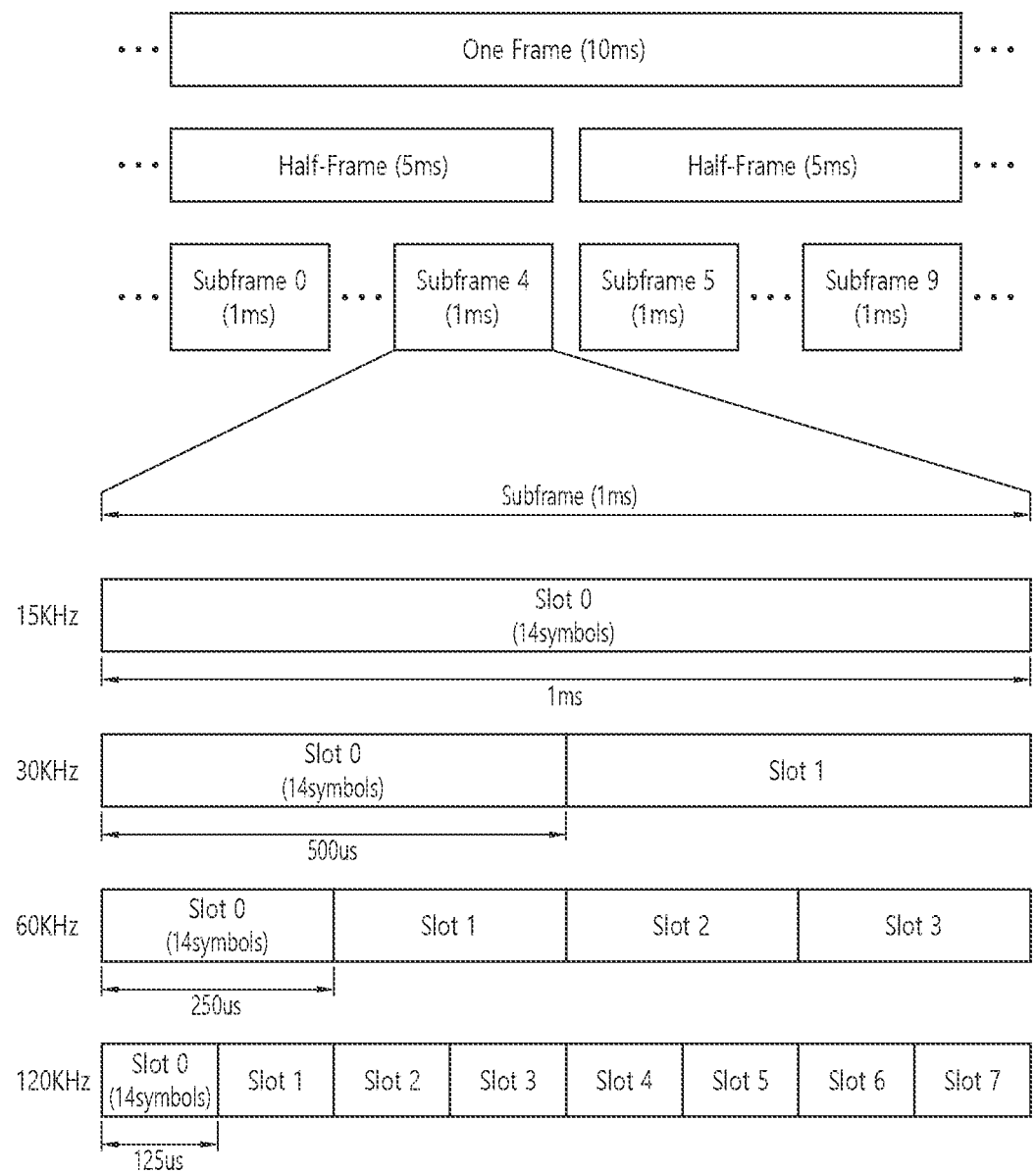
FIG. 6 illustrates an example of a frame structure that may be applied in NR.

FIG. 6 illustrates an example of a frame structure that may be applied in NR.

Referring to FIG. 6, in the NR, a radio frame (hereinafter, also referred to as a frame) may be used in uplink and downlink transmissions. The frame has a length of 10 ms, and may be defined as two 5 ms half-frames (HFs). The HF may be defined as five 1 ms subframes (SFs). The SF may be divided into one or more slots, and the number of slots within the SF depends on a subcarrier spacing (SCS). Each slot includes 12 or 14 OFDM(A) symbols according to a cyclic prefix (CP). In case of using a normal CP, each slot includes 14 symbols. In case of using an extended CP, each slot includes 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

The following table 1 illustrates a subcarrier spacing configuration µ.

TABLE 1

| µ | $\Delta f = 2^\mu \cdot 15[kHz]$ | Cyclic prefix |
|---|---|---|
| 0 | 15 | Normal |
| 1 | 30 | Normal |
| 2 | 60 | Normal |
|   |    | Extended |
| 3 | 120 | normal |
| 4 | 240 | normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations µ.

TABLE 2

| µ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 6 illustrates a case of µ=0, 1, 2, 3.

Table 2-1 below illustrates that the number of symbols per slot, the number of slots per frame, and the number of slots per subframe vary depending on the SCS, in case of using an extended CP (µ=2, 60 KHz).

TABLE 2-1

| µ | $N^{slot}_{symb}$ | $N^{frame,\mu}_{slot}$ | $N^{subframe,\mu}_{slot}$ |
|---|---|---|---|
| 2 | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
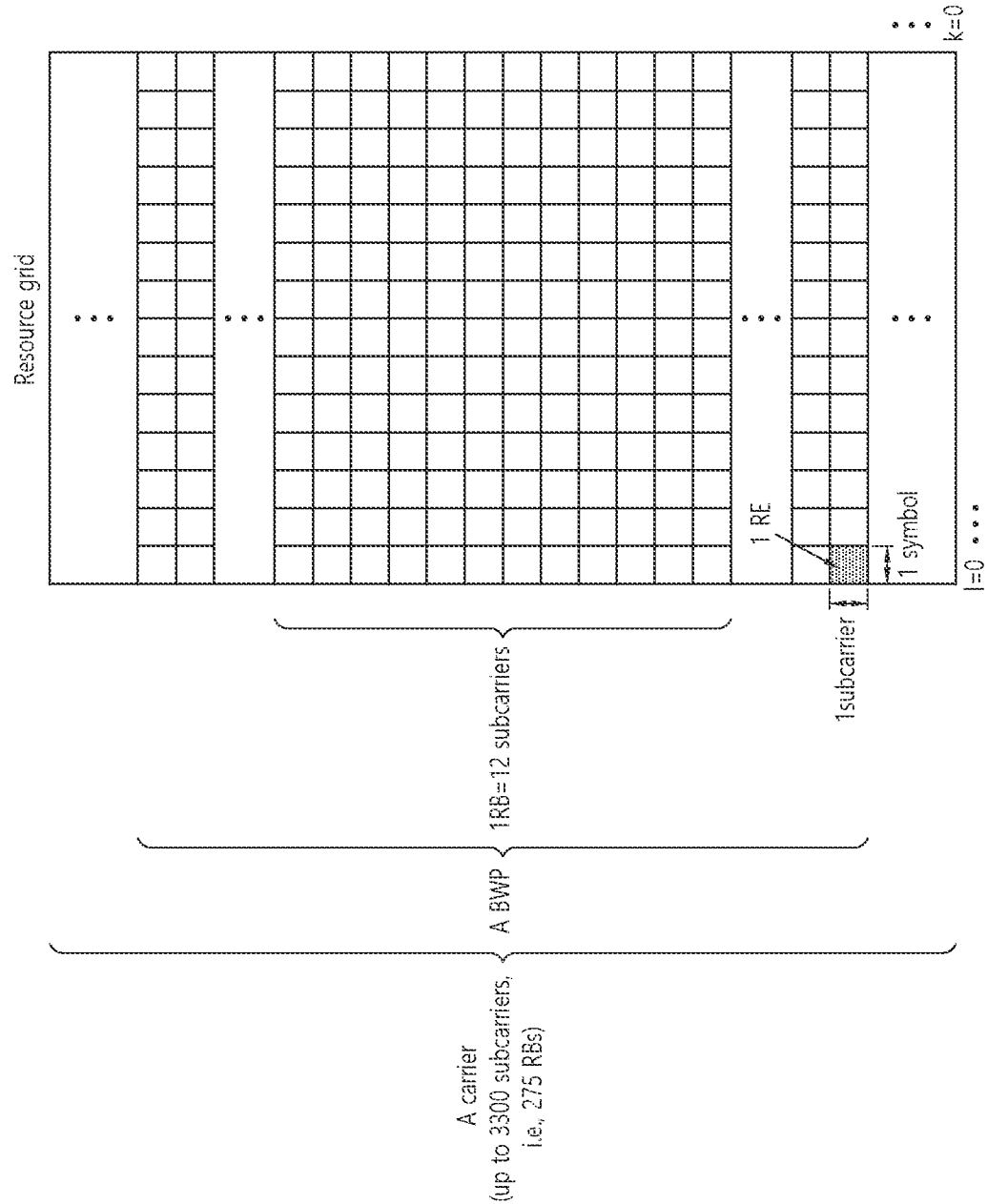
FIG. 7 illustrates a slot structure of an NR frame.

FIG. 7 illustrates a slot structure of an NR frame.

A slot may include a plurality of symbols in a time domain. For example, in case of a normal CP, one slot may include 7 symbols. However, in case of an extended CP, one slot may include 6 symbols. A carrier may include a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (physical) resource blocks ((P)RBs) in the frequency domain, and the BWP may correspond to one numerology (e.g., SCS, CP length, and so on). The carrier may include up to N (e.g., 5) BWPs. Data communication may be performed via an activated BWP, and only one BWP may be activated for one UE. In a resource grid, each element may be referred to as a resource element (RE), and one complex symbol may be mapped thereto.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Monitoring implies decoding of each PDCCH candidate according to a downlink control information (DCI) format. The UE monitors a set of PDCCH candidates in one or more CORESETs (to be described below) on an active DL BWP of each activated serving cell in which PDCCH monitoring is configured, according to a corresponding search space set.

A new unit called a control resource set (CORESET) may be introduced in the NR. The UE may receive a PDCCH in the CORESET.

Figure 8:
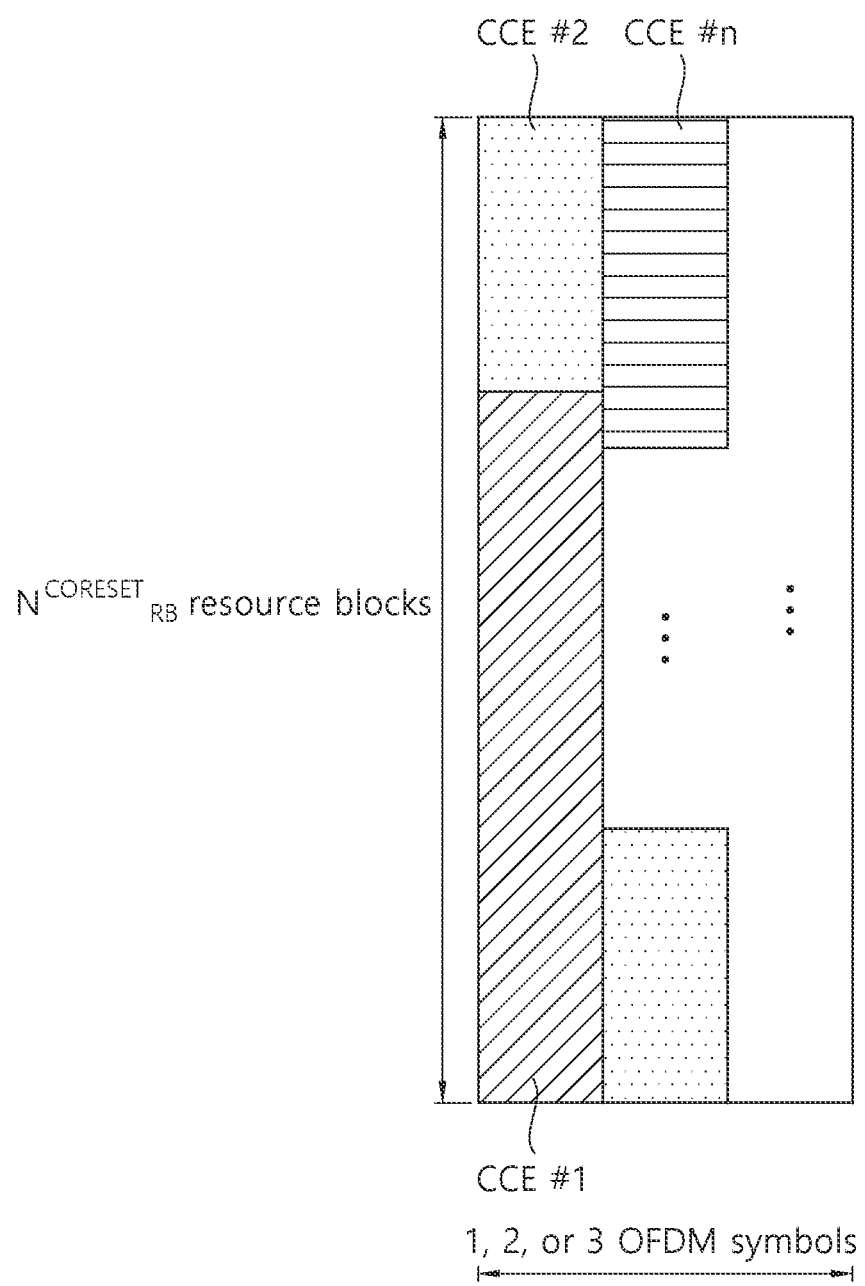
FIG. 8 illustrates CORESET.

FIG. 8 illustrates CORESET.

Referring to FIG. 8, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET. One CCE may be composed of a plurality of resource element groups (REGs), and one REG may include one OFDM symbol in the time domain and 12 resource elements in the frequency domain.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

Figure 9:
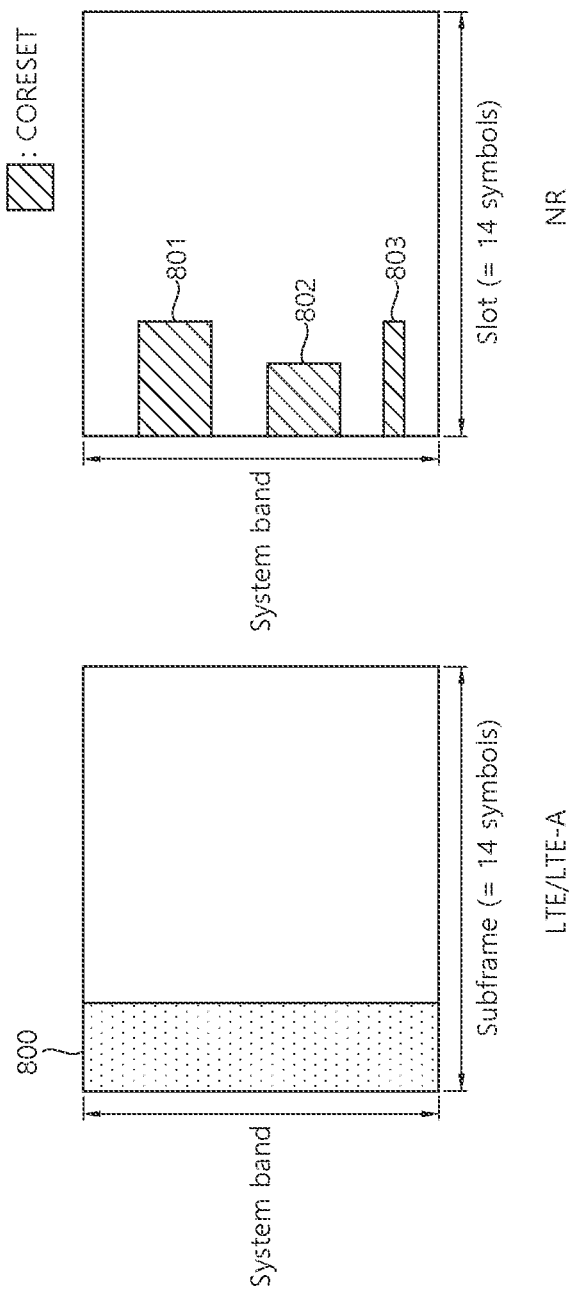
FIG. 9 is a diagram illustrating a difference between a related art control region and the CORESET in NR.

FIG. 9 is a diagram illustrating a difference between a related art control region and the CORESET in NR.

Referring to FIG. 9, a control region 800 in the related art wireless communication system (e.g., LTE/LTE-A) is configured over the entire system band used by a base station (BS). All the UEs, excluding some (e.g., eMTC/NB-IoT UE) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the UE and may use only a portion, rather than the entirety of the system bandwidth. The BS may allocate the CORESET to each UE and may transmit control information through the allocated CORESET. For example, in FIG. 9, a first CORESET 801 may be allocated to UE 1, a second CORESET 802 may be allocated to UE 2, and a third CORESET 803 may be allocated to UE 3. In the NR, the UE may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 10:
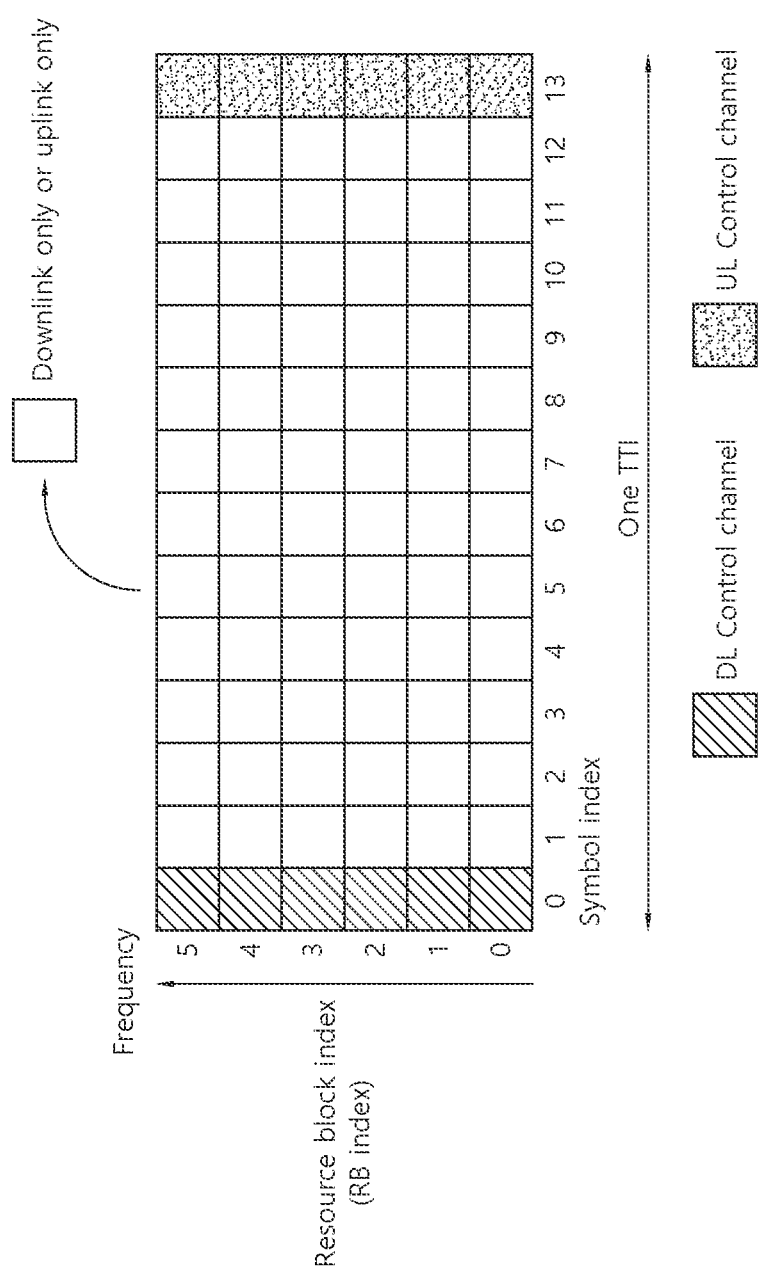
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 11:
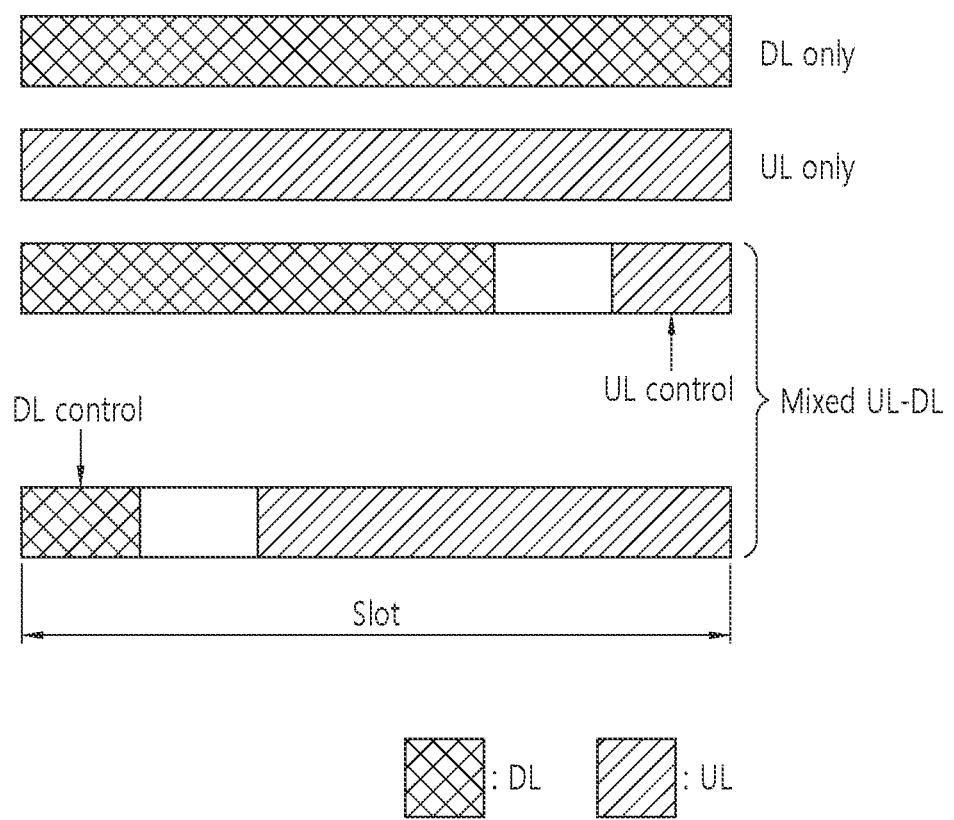
FIG. 11 illustrates a structure of a self-contained slot.

FIG. 11 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration
2. UL only configuration
3. Mixed UL-DL configuration

DL region+Guard period (GP)+UL control region

DL control region+GP+UL region

DL region: (i) DL data region, (ii) DL control region+DL data region

UL region: (i) UL data region, (ii) UL data region+UL control region

A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

System information of the NR system may be transmitted in a broadcasting manner. In this case, in one symbol, analog beams belonging to different antenna panels may be simultaneously transmitted. A scheme of introducing a beam RS (BRS) which is a reference signal (RS) transmitted by applying a single analog beam (corresponding to a specific antenna panel) is under discussion to measure a channel per analog beam. The BRS may be defined for a plurality of antenna ports, and each antenna port of the BRS may correspond to a single analog beam. In this case, unlike the BRS, a synchronization signal or an xPBCH may be transmitted by applying all analog beams within an analog beam group so as to be correctly received by any UE.

In the NR, in a time domain, a synchronization signal block (SSB, or also referred to as a synchronization signal and physical broadcast channel (SS/PBCH)) may consist of 4 OFDM symbols indexed from 0 to 3 in an ascending order within a synchronization signal block, and a PBCH associated with a primary synchronization signal (PSS), secondary synchronization signal (SSS), and demodulation reference signal (DMRS) may be mapped to the symbols. As described above, the synchronization signal block may also be represented by an SS/PBCH block.

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

In NR, beams may be used for transmission and reception. If reception performance of a current serving beam is degraded, a process of searching for a new beam through the so-called Beam Failure Recovery (BFR) may be performed.

Since the BFR process is not intended for declaring an error or failure of a link between the network and a UE, it may be assumed that a connection to the current serving cell is retained even if the BFR process is performed. During the BFR process, measurement of different beams (which may be expressed in terms of CSI-RS port or Synchronization Signal Block (SSB) index) configured by the network may be performed, and the best beam for the corresponding UE may be selected. The UE may perform the BFR process in a way that it performs an RACH process associated with a beam yielding a good measurement result.

Now, a transmission configuration indicator (hereinafter, TCI) state will be described. The TCI state may be configured for each CORESET of a control channel, and may determine a parameter for determining an RX beam of the UE, based on the TCI state.

For each DL BWP of a serving cell, a UE may be configured for three or fewer CORESETs. Also, a UE may receive the following information for each CORESET.

1) CORESET index p (one of 0 to 11, where index of each CORESET may be determined uniquely among BWPs of one serving cell), 2) PDCCH DM-RS scrambling sequence initialization value, 3) Duration of a CORESET in the time domain (which may be given in symbol units), 4) Resource block set, 5) CCE-to-REG mapping parameter, 6) Antenna port quasi co-location indicating quasi co-location (QCL) information of a DM-RS antenna port for receiving a PDCCH in each CORESET (from a set of antenna port quasi co-locations provided by a higher layer parameter called 'TCI-State'), 7) Indication of presence of Transmission Configuration Indication (TCI) field for a specific DCI format transmitted by the PDCCH in the CORESET, and so on.

QCL will be described. If a characteristic of a channel through which a symbol on one antenna port is conveyed can be inferred from a characteristic of a channel through which a symbol on the other antenna port is conveyed, the two antenna ports are said to be quasi co-located (QCLed). For example, when two signals A and B are transmitted from the same transmission antenna array to which the same/similar spatial filter is applied, the two signals may go through the same/similar channel state. From a perspective of a receiver, upon receiving one of the two signals, another signal may be detected by using a channel characteristic of the received signal.

In this sense, when it is said that the signals A and B are quasi co-located (QCLed), it may mean that the signals A and B have went through a similar channel condition, and thus channel information estimated to detect the signal A is also useful to detect the signal B. Herein, the channel condition may be defined according to, for example, a Doppler shift, a Doppler spread, an average delay, a delay spread, a spatial reception parameter, or the like.

A 'TCI-State' parameter associates one or two downlink reference signals to corresponding QCL types (QCL types A, B, C, and D, see Table 4).

TABLE 4

| QCL Type | Description |
| --- | --- |
| QCL-TypeA | Doppler shift, Doppler spread, Average delay, Delay spread |
| QCL-TypeB | Doppler shift, Doppler spread' |
| QCL-TypeC | Doppler shift, Average delay |
| QCL-TypeD | Spatial Rx parameter |

Each 'TCI-State' may include a parameter for configuring a QCL relation between one or two downlink reference signals and a DM-RS port of a PDSCH (or PDDCH) or a CSI-RS port of a CSI-RS resource.

Meanwhile, for each DL BWP configured to a UE in one serving cell, the UE may be provided with 10 (or less) search space sets. For each search space set, the UE may be provided with at least one of the following information.

1) search space set index s ($0 \leq s < 40$), 2) an association between a CORESET p and the search space set s, 3) a PDCCH monitoring periodicity and a PDCCH monitoring offset (slot unit), 4) a PDCCH monitoring pattern within a slot (e.g., indicating a first symbol of a CORSET in a slot for PDCCH monitoring), 5) the number of slots in which the search space set s exists, 6) the number of PDCCH candidates per CCE aggregation level, 7) information indicating whether the search space set s is CSS or USS.

In the NR, a CORESET #0 may be configured by a PBCH (or a UE-dedicated signaling for handover or a PSCell configuration or a BWP configuration). A search space (SS) set #0 configured by the PBCH may have monitoring offsets (e.g., a slot offset, a symbol offset) different for each associated SSB. This may be required to minimize a search space occasion to be monitored by the UE. Alternatively, this may be required to provide a beam sweeping control/data region capable of performing control/data transmission based on each beam so that communication with the UE is persistently performed in a situation where a best beam of the UE changes dynamically.

Figure 12:
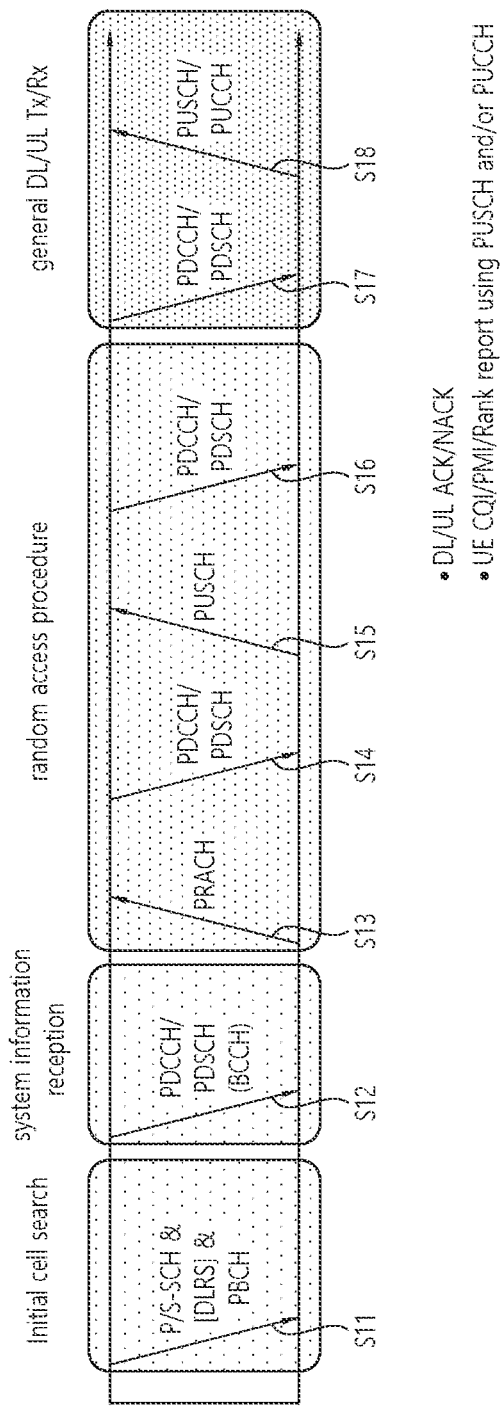
FIG. 12 illustrates physical channels and typical signal transmission.

FIG. 12 illustrates physical channels and typical signal transmission.

Referring to FIG. 12, in a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13~S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (S16).

After performing the aforementioned procedure, the UE may perform PDCCH/PDSCH reception (S17) and PUSCH/physical uplink control channel (PUCCH) transmission (S18) as a typical uplink/downlink signal transmission procedure. Control information transmitted by the UE to the BS is referred to as uplink control information (UCI). The UCI includes hybrid automatic repeat and request (HARQ) acknowledgement (ACK)/negative-ACK (HACK), scheduling request (SR), channel state information (CSI), or the like. The CSI includes a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/instruction of a network.

In order to enable reasonable battery consumption when bandwidth adaptation (BA) is configured, only one uplink BWP and one downlink BWP or only one downlink/uplink BWP pair for each uplink carrier may be activated at once in an active serving cell, and all other BWPs configured in the UE are deactivated. In the deactivated BWPs, the UE does not monitor the PDCCH, and does not perform transmission on the PUCCH, PRACH, and UL-SCH.

For the BA, RX and TX bandwidths of the UE are not necessarily as wide as a bandwidth of a cell, and may be adjusted. That is, it may be commanded such that a width is changed (e.g., reduced for a period of low activity for power saving), a position in a frequency domain is moved (e.g., to increase scheduling flexibility), and a subcarrier spacing is changed (e.g., to allow different services). A subset of the entire cell bandwidth of a cell is referred to as a bandwidth part (BWP), and the BA is acquired by configuring BWP(s) to the UE and by notifying the UE about a currently active BWP among configured BWPs. When the BA is configured, the UE only needs to monitor the PDCCH on one active BWP. That is, there is no need to monitor the PDCCH on the entire downlink frequency of the cell. A BWP inactive timer (independent of the aforementioned DRX inactive timer) is used to switch an active BWP to a default BWP. That is, the timer restarts when PDCCH decoding is successful, and switching to the default BWP occurs when the timer expires.

Figure 13:
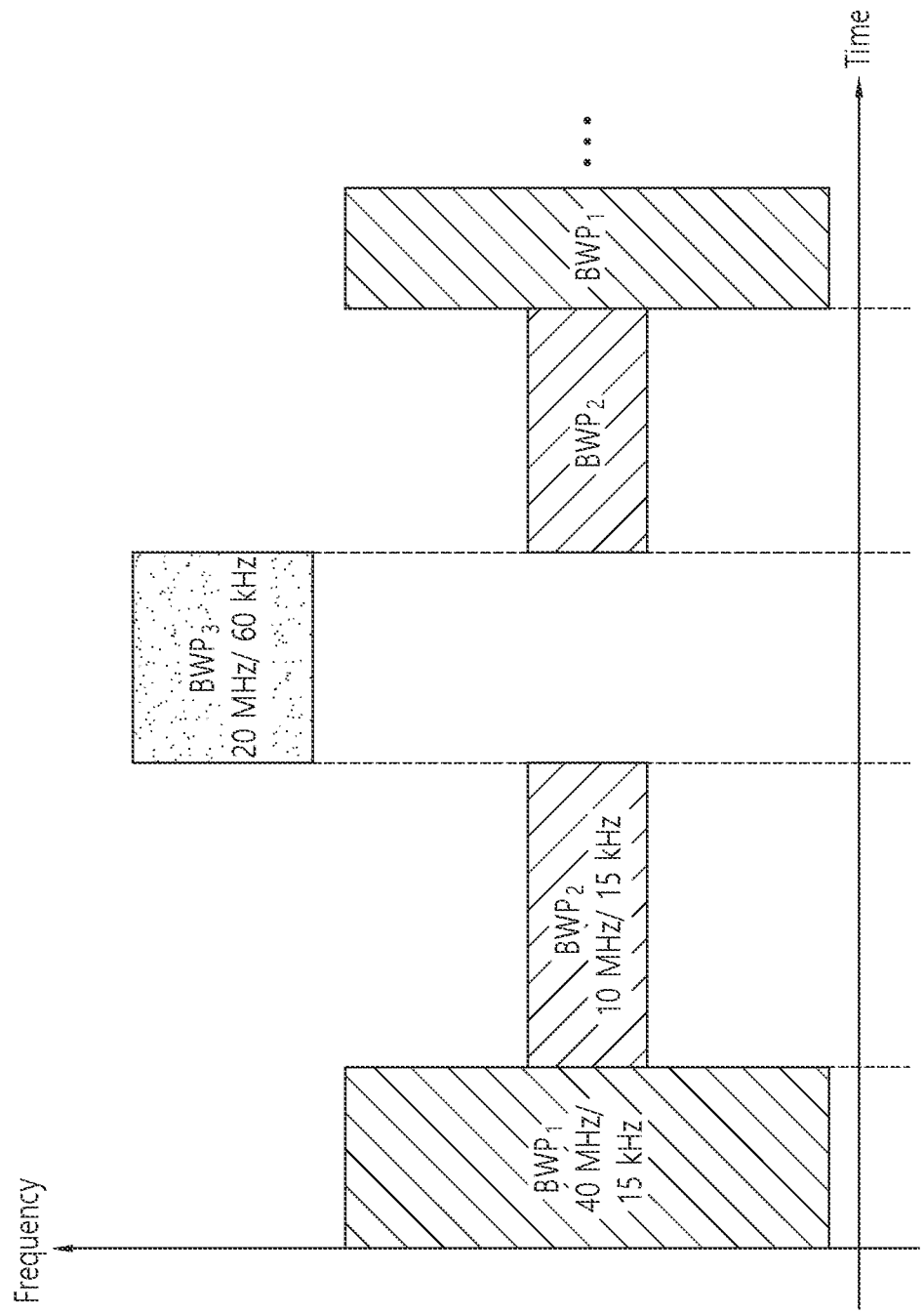
FIG. 13 illustrates a scenario in which three different bandwidth parts are configured.

FIG. 13 illustrates a scenario in which three different bandwidth parts are configured.

FIG. 13 shows an example in which $BWP_1$, $BWP_2$, and $BWP_3$ are configured on a time-frequency resource. The $BWP_1$ may have a width of 40 MHz and a subcarrier spacing of 15 kHz. The $BWP_2$ may have a width of 10 MHz and a subcarrier spacing of 15 kHz. The $BWP_3$ may have a width of 20 MHz and a subcarrier spacing of 60 kHz. In other words, each BWP may have a different width and/or a different subcarrier spacing.

Discontinuous reception (DRX) will now be described.

Figure 14:
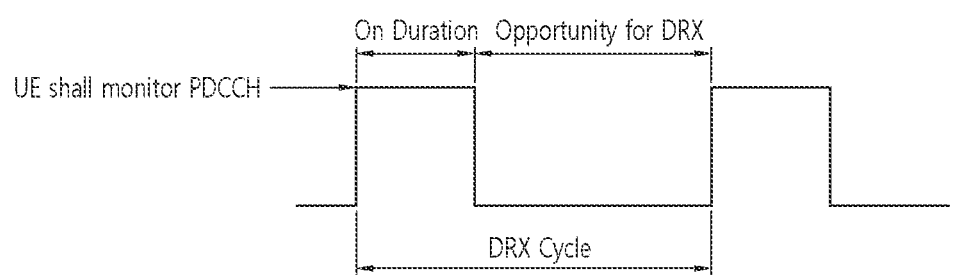
FIG. 14 illustrates a DRX cycle.

FIG. 14 illustrates a DRX cycle.

Referring to FIG. 14, the DRX cycle may consist of 'On Duration (on-duration, hereinafter may also be referred to as DRX on-duration)' and 'Opportunity for DRX'. The DRX cycle defines a time interval in which the on-duration is cyclically repeated. The on-duration indicates a time duration in which a UE performs monitoring to receive a PDCCH. If DRX is configured, the UE performs PDCCH monitoring during the 'on-duration'. If there is a PDCCH successfully detected during the PDCCH monitoring, the UE operates an inactivity timer and maintains an awake state. On the other hand, if there is no PDCCH successfully detected during the PDCCH monitoring, the UE enters a sleep state after the 'on-duration' ends.

Table 5 shows a UE procedure related to DRX (RRC_CONNECTED state). Referring to Table 5, DRX configuration information may be received through higher layer (e.g., RRC) signaling. Whether DRX is ON or OFF may be controlled by a DRX command of a MAC layer. If the DRX is configured, PDCCH monitoring may be performed discontinuously.

TABLE 5

| | Type of signals | UE procedure |
| --- | --- | --- |
| $1^{st}$ step | RRC signalling (MAC-CellGroupConfig) | Receive DRX configuration information |
| $2^{nd}$ step | MAC CE ((Long) DRX command MAC CE) | Receive DRX command |
| $3^{rd}$ step | — | Monitor a PDCCH during an on-duration of a DRX cycle |

MAC-CellGroupConfig may include configuration information required to configure a medium access control (MAC) parameter for a cell group. MAC-CellGroupConfig may also include configuration information regarding DRX. For example, MAC-CellGroupConfig may include information for defining DRX as follows.

Value of drx-OnDurationTimer: This defines a length of a duration at the beginning of a DRX cycle.

Value of drx-InactivityTimer: This defines a length of a time duration in which the UE is in an awake state, after a PDCCH occasion in which a PDCCH indicating initial UL or DL data is detected.

Value of drx-HARQ-RTT-TimerDL: This defines a length of a maximum time duration until DL retransmission is received, after DL initial transmission is received.

Value of drx-HARQ-RTT-TimerUL: This defines a length of a maximum time duration until a grant for UL retransmission is received, after a grant for UL initial transmission is received.

drx-LongCycleStartOffset: This defines a time length and a starting point of a DRX cycle drx-ShortCycle (optional): This defines a time length of a short DRX cycle.

Herein, if any one of drx-OnDurationTimer, drx-InactivityTimer, drx-HARQ-RTT-TimerDL, and drx-HARQ-RTT-TimerUL is operating, the UE performs PDCCH monitoring in every PDCCH occasion while maintaining an awake state.

The UE may know a starting point of a DRX cycle, a duration (duration time) of the DRX cycle, a starting point of an on-duration timer, and a duration of the on-duration timer according to a DRX configuration. Thereafter, the UE attempts reception/detection for scheduling information (i.e., PDCCH) within the on-duration of each DRX cycle (this may be represented that scheduling information is monitored).

If the scheduling information (PDCCH) is detected within the on-duration of the DRX cycle (DRX-on duration), an inactivity timer is activated, and detection is attempted for another scheduling information during a given inactivity timer duration (a time duration in which the inactivity timer runs). In this case, the on-duration and the inactivity timer duration in which the UE performs the signal reception/detection operation may be together referred to as an active time. If the scheduling information is not detected in the on-duration, only the on-duration may be the active time.

When the inactivity timer ends without reception/detection of an additional signal (a control signal or data), the UE does not perform scheduling information and corresponding DL reception/UL transmission until an on-duration of a next DRX cycle (a DRX on duration) starts after the inactivity timer ends.

A duration adjustment of a DRX cycle, a duration adjustment of an on-duration timer/inactivity timer, or the like plays an important role in determining whether the UE sleeps. According to the setting for a corresponding parameter, the network may configure the UE to frequently sleep or continuously perform monitoring on the scheduling information. This may act as an element for determining whether power saving of the UE will be achieved.

Now, the present disclosure will be described.

The present disclosure proposes a method of determining an occasion (time point) for monitoring a DCI (or signal) indicating wake up (or go-to-sleep), considerations in the corresponding process, and a UE operation.

In NR, a wake up signal (WUS) may be introduced to save power of the UE. The WUS may indicate, for example, whether to perform PDCCH monitoring in a DRX on-duration in connection with a DRX operation (or DRX cycle).

WUS may be provided in the form of DCI. A new DCI for WUS (which may also be referred to as WUS DCI) may be considered, and a WUS monitoring occasion (time point, hereinafter the same) for performing WUS monitoring needs to be defined. When the WUS is provided in DCI (e.g., DCI format 2_6), the DCI may be transmitted through a PDCCH, and the DCI may be referred to as a WUS DCI. In this case, WUS monitoring is an expression equivalent to PDCCH monitoring for detection of the DCI. A PDCCH including the DCI (e.g., DCI format 2_6) may be referred to as a WUS PDCCH.

In the present disclosure, a method for defining WUS monitoring and a method for determining a WUS monitoring occasion according to DRX parameters are proposed. In the disclosure below, on-duration (of DRX) associated with WUS may be a 1:1 mapping between WUS and DRX cycle, a case of waking up in multiple DRX cycles by one WUS may also be included. Performing PDCCH monitoring in on-duration may mean performing monitoring of a configured search space set during on-duration like the existing DRX operation.

A method of configuring/controlling wake up for multiple DRX cycles by one WUS may be as follows. The options below can be implemented alone or in combination.

Option 1) If there are multiple DRX cycles between consecutive WUS monitoring occasions without an indication of the number of DRX cycles associated with one WUS, the UE may assume that a WUS monitoring result before the multiple DRX cycles determines whether to wake up in the multiple DRX cycles. Alternatively, in the above case, the network may configure whether to wake up all of the multiple DRX cycles or wake up only in the first or some of the multiple DRX cycles. This may be effective for a UE that occasionally receives a large amount of data.

Option 2) it configures a WUS monitoring occasion for each DRX cycle, and it may indicate the number of DRX cycles (e.g., a natural number of 0, 1 or 2 or more) to wake up (or to sleep) through WUS transmitted on each WUS monitoring occasion. In this case, even if the UE fails to detect a WUS, since it can detect a WUS in the next DRX cycle, damage such as an increase in latency can be reduced even when a WUS for multiple DRX cycles is not detected. A UE instructed to wake up for multiple DRX cycles may perform PDCCH monitoring without WUS detection on a WUS monitoring occasion associated with the corresponding DRX cycle.

Hereinafter, the WUS operation based on the wake-up operation will be mainly described, but the present disclosure may be equally applied to a go-to-sleep (GTS) operation. For example, the UE that has detected the WUS PDCCH performs the existing operation (attempt to detect the PDCCH) in the DRX interval(s) associated with or indicated for the WUS PDCCH, but, in some cases, the UE detecting the WUS PDCCH may not perform all or part of the existing operation in the associated or indicated DRX interval(s). For example, when it is configured that WUS is necessarily transmitted on all WUS occasions, or when one WUS DCI includes WUS for multiple UEs, it may be assumed that a go-to-sleep rather than a wake-up is applied.

<Determination of Monitoring Occasion for WUS>

For a monitoring occasion (or monitoring window) for WUS DCI, a method of designating through an offset from the start point of the associated DRX on-duration (option 1 to be described later) and a method using an existing search space set configuration (option 2 to be described later) may be considered.

Wake-up in DRX operation serves to configure whether to monitor PDCCH in a specific DRX cycle(s), and more specifically, configures whether to monitor PDCCH in on-duration of a specific DRX cycle(s). The operation after the wake up may be performed in the same way as the existing DRX operation. Therefore, it may be assumed that the monitoring occasion configured by the proposal below is valid only till the start point of the on-duration of the next DRX cycle from the time when all transmissions/receptions in the previous DRX cycle are finished. Alternatively, it may be assumed that the monitoring occasion configured by the proposal below is only in the DRX off-period, that is, in the non-active time.

Meanwhile, in a specific situation in which WUS monitoring is not possible, PDCCH monitoring may be performed in on-duration associated with the corresponding WUS regardless of the WUS. As an example, when one WUS indicates whether to wake up in multiple DRX cycles, PDCCH monitoring may be performed only on-duration of the first DRX cycle among the multiple DRX cycles, or PDCCH monitoring may be performed on-duration of all associated DRX cycles.

In addition, if the UE fails to monitor the WUS in a situation where one WUS is configured to indicate wake-up in multiple DRX cycles, the network may instruct the UE i) whether to perform PDCCH monitoring only on-duration of the first DRX cycle, or ii) whether to perform PDCCH monitoring in on-duration of all associated DRX cycles.

Option 1) Configure monitoring occasion for WUS DCI based on offset from associated on-duration.

In the case of a method using an offset, such as option 1, even when the DRX cycle is dynamically changed by multiple DRX parameters, etc., there is an advantage that configure for the WUS monitoring occasion can be applied without changing the parameters. In addition, the following parameters for WUS monitoring may be specified together with an offset from the start point of on-duration (in this disclosure, the offset may mean an offset in a previous direction with respect to the on-duration time).

All or part of the parameters below may be indicated to each UE, and when some are indicated, all or part of the parameters not indicated may be configured by a predefined definition. For example, if the CORESET ID is not indicated, the CORESET for monitoring the WUS DCI may be all or a part (e.g., a CORESET having the lowest ID) of the CORESET configured at an active time. In addition, the following contents may be configured for each offset (when a plurality of offsets are applied), or the same configuration may be applied to a plurality of offsets.

1. CORESET ID

A. The CORESET ID that should be assumed in the resource designated by the corresponding offset may be indicated together.

B. When supporting multiple monitoring occasions, the following method may be considered according to the characteristics of the multiple monitoring occasions.

i. Multiple monitoring occasions for beam sweeping may be considered in order to respond to a change in beam characteristics due to a change in the location of the UE in the DRX off period. In this case, multiple CORESET IDs and an offset corresponding to each ID may be indicated. Alternatively, one offset and multiple CORESET IDs may be indicated, and an offset between CORESETs may be additionally indicated.

ii. In the case of multiple monitoring occasions to increase the monitoring opportunity, when the WUS DCI cannot be transmitted in the resource designated as the monitoring occasion (e.g., when the corresponding slot is used as an uplink slot), it may be to designate an additional monitoring occasion. In this case, a plurality of offsets may be indicated, or X consecutive slots may be configured as a monitoring occasion from a resource indicated by a single offset and designated by the corresponding offset (or offset by a predefined or network-directed interval (monitoring occasion(s))).

2. Symbol Offset within a Slot

A. The network may indicate not only the slot offset from the on-duration start point, but also the symbol offset within the corresponding slot.

B. The slot offset and the symbol offset may be indicated as one parameter through joint encoding.

3. A Monitored Aggregation Level (AL) and the Number of Candidates for Each Aggregation Level A. The network may indicate an AL that should be assumed in WUS monitoring and the number of candidates for each AL.

B. The number of monitored ALs and candidates may be fixed by predefined in order to reduce signaling overhead and the like.

C. The symbol offset may be interpreted as indicating the position of the first symbol of the associated CORESET in the slot.

4. Search Space (SS) Type

A. Since the method of determining the monitoring occasion by the offset does not use the existing search space set configuration, the types of search spaces belonging to the corresponding monitoring occasion are not defined. Since this may affect the determination of a demodulation reference signal (DMRS) and a PDCCH scrambling parameter, it may be preferable to additionally indicate the SS type in determining the monitoring occasion of the offset indication method.

B. For example, when transmitting one WUS DCI to multiple UEs, since it is preferable that the UEs assume the same scrambling, it is preferable that scrambling by cell ID is applied by designating search spaces in the corresponding monitoring occasion as a common search space (CSS). On the other hand, when the WUS DCI is transmitted to a specific UE only, it is preferable that the corresponding scrambling is applied to UE-specific parameters such as C-RNTI.

C. The search space type may be interpreted as a method of instructing the UE whether the corresponding WUS DCI is a group-based DCI or a UE-specific DCI. For example, when a monitoring occasion for monitoring WUS DCI is configured with CSS, the UE may perform decoding on the assumption of group-based DCI.

The offset-type monitoring occasion designation method may be implemented by applying different interpretations to some fields of the existing search space set configuration. For example, among parameters in the existing search space set configuration, "monitoringSlotPeriodicityAndOffset" is used to indicate monitoring periodicity and slot offset for the corresponding search space set. In the search space set for WUS monitoring, the corresponding parameter can be interpreted as an offset of the WUS monitoring occasion with respect to the on-duration start point. The parameters in the search space set configuration other than "monitoringSlotPeriodicityAndOffset" can be applied in the existing way or the above suggestions.

The slot offset proposed in the present disclosure may be applied in the following manner.

Alt 1) Number of Slots

The offset may be interpreted as the number of slots regardless of the slot type (e.g., downlink, uplink, downlink+uplink). Accordingly, Alt 1 may be interpreted as a simple time. For example, since 1 slot corresponds to 1 msec in numerology of 15 kHz, the offset "X" configured by the present disclosure may be interpreted (in 15 kHz neurology) as X slots, X msec.

Alt 2) Number of Downlink Slots

An offset may be applied based on slots configured in downlink for all symbols, and/or slots configured in downlink for a monitoring occasion configured for a UE. For example, when slot "N" is the slot where DRX on-duration starts, when slot "N−1" is configured as an uplink slot and slot "N−2" is configured as a downlink slot, and when the slot offset of the WUS monitoring occasion is 1, since the UE applies the offset based on only the downlink slot, WUS monitoring can be performed in slot "N−2". This can be effective as a method of preventing a case in which WUS cannot be transmitted because the WUS monitoring occasion is configured in the resource allocated to the uplink.

Alt 3) the number of available slots

Alt 3 may be a method including a flexible slot (or symbol) in alt 2. That is, when a resource configured as a monitoring occasion by WUS configuration is downlink or flexible, the UE may apply the offset based on only the corresponding slots. Here, the flexible may mean a resource in which uplink/downlink or not can be determined by DCI format 2-0 or the like.

Option 2) Configure monitoring occasion for WUS DCI using search space set configuration.

The following table is an example of a search space set configuration.

TABLE 6

```
-- ASN1START
-- TAG-SEARCHSPACE-START
SearchSpace ::=                          SEQUENCE {
   searchSpaceId                            SearchSpaceId,
   controlResourceSetId                     ControlResourceSetId
OPTIONAL, -- Cond SetupOnly
   monitoringSlotPeriodicityAndOffset           CHOICE {
      s11                                   NULL,
      s12                                   INTEGER (0..1),
      s14                                   INTEGER (0..3),
      s15                                   INTEGER (0..4),
      s18                                   INTEGER (0..7),
      s110                                  INTEGER (0..9),
      s116                                  INTEGER (0..15),
      s120                                  INTEGER (0..19),
      s140                                  INTEGER (0..39),
      s180                                  INTEGER (0..79),
      s1160                                 INTEGER (0..159),
      s1320                                 INTEGER (0..319),
      s1640                                 INTEGER (0..639),
      s11280                                INTEGER (0..1279),
      s12560                                INTEGER (0..2559)
   }
OPTIONAL, -- Cond Setup
   duration           INTEGER (2..2559)                OPTIONAL, -- Need R
   monitoringSymbolsWithinSlot   BIT STRING (SIZE(14))   OPTIONAL, -- Cond Setup
   nrofCandidates                           SEQUENCE {
      aggregationLevel1                        ENUMERATED {n0, n1, n2, n3, n4, n5, n6, n8},
      aggregationLevel2                        ENUMERATED {n0, n1, n2, n3, n4, n5, n6, n8},
      aggregationLevel4                        ENUMERATED {n0, n1, n2, n3, n4, n5, n6, n8},
      aggregationLevel8                        ENUMERATED {n0, n1, n2, n3, n4, n5, n6, n8},
      aggregationLevel16                       ENUMERATED {n0, n1, n2, n3, n4, n5, n6, n8}
   }                                         OPTIONAL, -- Cond Setup
   searchSpaceType                          CHOICE {
      common                                   SEQUENCE {
         dci-Format0-0-AndFormat1-0                SEQUENCE {
            ...
         }                                    OPTIONAL, -- Need R
         dci-Format2-0                        SEQUENCE {
            nrofCandidates-SFI                    SEQUENCE {
               aggregationLevel1     ENUMERATED {n1, n2}    OPTIONAL, -- Need R
               aggregationLevel2     ENUMERATED {n1, n2}    OPTIONAL, -- Need R
               aggregationLevel4     ENUMERATED {n1, n2}    OPTIONAL, -- Need R
               aggregationLevel8     ENUMERATED {n1, n2}    OPTIONAL, -- Need R
               aggregationLevel16    ENUMERATED {n1, n2}    OPTIONAL -- Need R },
            ...
         }                                    OPTIONAL, -- Need R
         dci-Format2-1                        SEQUENCE {
            ...
         }                                    OPTIONAL, -- Need R
         dci-Format2-2                        SEQUENCE {
            ...
         }                                    OPTIONAL, -- Need R
         dci-Format2-3                        SEQUENCE {
            dummy1   ENUMERATED {s11, s12, s14, s15, s18, s110, s116, s120}
                     OPTIONAL, -- Cond Setup
            dummy2   ENUMERATED {n1, n2},
```

TABLE 6-continued

```
            ...
        }                              OPTIONAL -- Need R
    },
    ue-Specific                        SEQUENCE {
        dci-Formats          ENUMERATED {formats0-0-And-1-0, formats0-1-And-1-1},
        ...
    }
  }                                    OPTIONAL -- Cond Setup
}
-- TAG-SEARCHSPACE-STOP
-- ASN1STOP
```

In the table, 'duration' is the number of consecutive slots in the search space that lasts on every occasion given by periodicity and offset (Number of consecutive slots that a SearchSpace lasts in every occasion, i.e., upon every period as given in the periodicityAndOffset).

'monitoringSlotPeriodicityAndOffset' indicates slots for PDCCH monitoring composed of periodicity and offset. When the UE is configured to monitor DCI format 2_1, only the values 'sl1', 'sl2' or 'sl4' may be applicable. When the UE is configured to monitor DCI format 2_0, only the values 'sl1', 'sl2', 'sl4', 'sl5', 'sl8', 'sl10', 'sl16' and 'sl20' may be applicable.

'monitoringSymbolsWithinSlot' indicates the first symbol (see SlotPeriodicityAndOffset and duration monitoring) for PDCCH monitoring in a slot configured for PDCCH monitoring. The most significant bit (left) bit represents the first OFDM symbol in the slot, and the next most significant bit (left) bit represents the second OFDM symbol in the slot. The bit(s) configured to 1 identifies the first OFDM symbol(s) of the CORESET within the slot. When the cyclic prefix of the BWP is configured as an extended CP, the last two bits in the bit stream are ignored by the UE. In the case of DCI format 2_0, if the CORESET section identified by 'controlResourceSetId' represents three symbols, the first one symbol is applied, and if the CORESET section identified by controlResourceSetId represents two symbols, the first two symbols are applied. When the CORESET section identified by controlResourceSetId represents 1 symbol, the first three symbols are applied.

'nrofCandidates-SFI' indicates the number of PDCCH candidates for DCI format 2-0 for the configured aggregation level. If there is no aggregation level, the UE does not search for candidates having the corresponding aggregation level. A network can configure only one aggregation level and a corresponding number of candidates.

'nrofCandidates' indicates the number of PDCCH candidates per aggregation level. The number of configured candidates and aggregation levels can be applied to any format unless a specific value is specified or a value for each format is provided.

When the monitoring occasion for WUS DCI is determined using the existing search space set configuration, some of the monitoring occasions configured in the search space set configuration can be interpreted as WUS DCI, this may mean that WUS DCI is monitored for one or more monitoring occasions closest to on-duration among the monitoring occasions before on-duration. Parameters other than the parameters for determining the monitoring occasion may be applied in the conventional manner. The network may indicate how many monitoring occasions WUS DCI is monitored before on-duration together with the search space set configuration indicated to monitor the WUS DCI.

Alternatively, the UE may monitor the WUS DCI only on an available occasion among the monitoring occasions configured by the search space set configuration, and the available occasion may be defined by the following criteria.

The nearest valid occasion before X slots (or X msec) from the start of the associated on-duration.

Here, a valid occasion is a duration in which the OFDM symbol including the WUS PDCCH candidate is completely indicated as downlink (DL) (characteristically, it may be a duration indicated as DL by a semi-static configuration (configuration indicated by RRC signaling) and/or a duration indicated as DL by dynamic SFI (configuration indicated by DCI)) and a non-overlapping duration in the time domain with the previous active time.

WUS PDCCH is not expected if a valid occasion has a gap of Y slot (or Y msec) or more from the start point of on-duration, it can be configured to perform PDCCH monitoring in the associated on-duration(s) (X and Y can be configured to the same value).

The X and Y values may be configured or interpreted as different values depending on the numerology of the (active) BWP including the WUS SS (or monitoring the WUS).

The X and Y values may be configured or interpreted differently depending on the DRX type (long/short) and/or the DRX cycle value.

The X and Y values may include 0. 0 may mean that WUS transmission is not expected. In this case, PDCCH monitoring is performed in the associated on-duration.

The network may indicate a plurality of search space set configurations for WUS DCI monitoring. This may be interpreted as a method for transmitting and receiving WUS DCI using a CORESET linked to different TCIs, or as a method for configuring a monitoring occasion adaptively to various DRX configurations.

Figure 15:
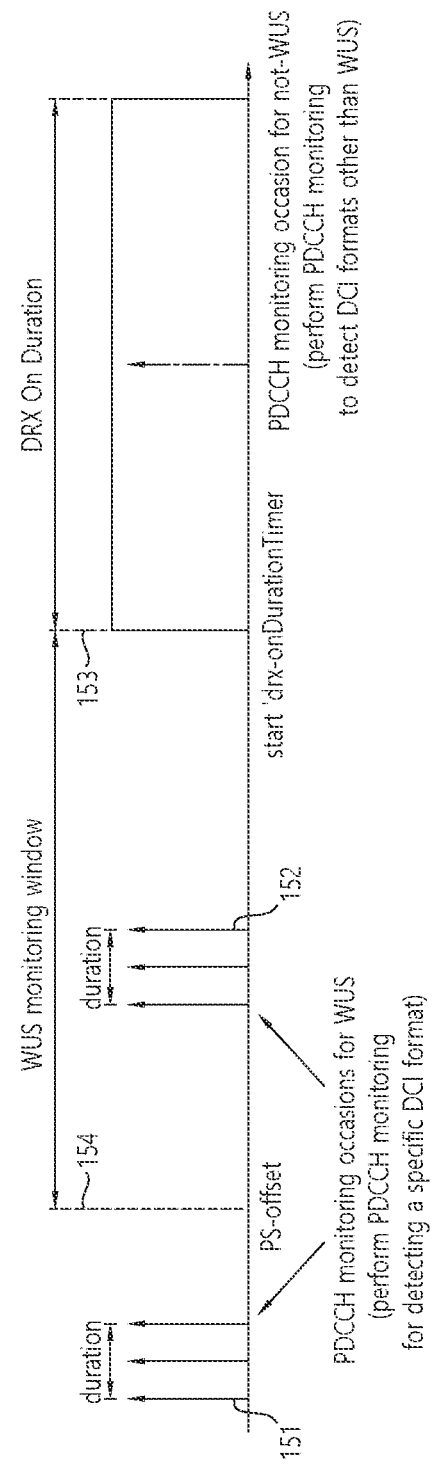
FIG. 15 illustrates a WUS monitoring occasion.

FIG. 15 illustrates a WUS monitoring occasion.

Referring to FIG. 15, the WUS monitoring occasion may be determined based on a message configuring a search space as shown in Table 6. Here, the WUS may be a DCI format including a wake-up indication. For example, DCI format 2_6 is a DCI format used to inform the UE of power saving information outside the DRX active time, DCI format 2_6 may include, for example, a wake-up indication (1 bit), information related to dormancy of the secondary cell, and the like. This DCI format is transmitted through the PDCCH. Accordingly, the WUS monitoring may be expressed as one of PDCCH monitoring.

As described above, 'monitoringSlotPeriodicityAndOffset' of Table 6 may inform slots for PDCCH monitoring based on periodicity and offset, it can be said that these slots correspond to the occasion for PDCCH monitoring. In addition, 'duration' indicates consecutive slots in which the search space is continued in each occasion. In FIGS. 15, 151 and 152 may be referred to as PDCCH monitoring occasions configured by 'monitoringSlotPeriodicityAndOffset', the search space continues in three consecutive slots on each PDCCH monitoring occasion.

Meanwhile, among the PDCCH monitoring occasions configured as above, the PDCCH monitoring occasion capable of monitoring the WUS may be limited to being within the interval (Let's call this the WUS monitoring window) between the start slot of the DRX On duration (i.e. slot where drx-onDurationTimer starts, 153) and the time 154 indicated by the offset (ps-offset) value. That is, in FIG. 15, 151 is outside the WUS monitoring window, and 152 is within the WUS monitoring window. Therefore, the UE may perform PDCCH monitoring for WUS detection only on the PDCCH monitoring occasion corresponding to 152.

When the UE detects the WUS within the WUS monitoring window, the UE may perform a necessary operation in the DRX on duration based on the WUS. For example, if the WUS instructs the UE to wake up, PDCCH monitoring for detecting a general DCI format other than the WUS may be performed by waking up in the DRX on duration.

Above, it was proposed to monitor WUS DCI only on available occasions among monitoring occasions configured by the search space set configuration. This may mean that when the monitoring periodicity of the search space set and the DRX cycle do not have a multiple relationship, the distance between the on-duration and the WUS monitoring occasion may appear differently for each DRX cycle. In this case, since it cannot be assumed that the time for the UE to prepare for PDCCH monitoring in on-duration is constant, the complexity of the UE implementation may increase. In order to solve such a problem, the present disclosure proposes to align the monitoring periodicity of the search space set and the DRX cycle, and the following method may be considered.

Method 1) It can be assumed that only a value common to the DRX cycle is used for the monitoring periodicity of the WUS search space set. For example, if a long DRX cycle can be configured with a value of one of {10 ms, 20 ms, 32 ms, 40 ms, 60 ms, 64 ms, 70 ms, 80 ms, 128 ms, 160 ms, 256 ms, 320 ms, 512 ms, 640 ms, 1024 ms, 1280 ms, 2048 ms, 2560 ms, 5120 ms, 10240 ms}, the monitoring periodicity of the search space set can be configured as a value of one of {1 slot, 2 slots, 4 slots, 5 slots, 8 slots, 10 slots, 16 slots, 20 slots, 40 slots, 80 slots, 160 slots, 320 slots, 640 slots, 1280 slots, 2560 slots}. Method 1 may mean that it is assumed that the WUS monitoring periodicity is indicated only by a common value in the two configurations.

Method 2) It can be assumed that the monitoring periodicity of the WUS search space set is selected from the DRX cycle pool or that the monitoring periodicity of the WUS search space set is the same as the associated DRX cycle. If monitoring periodicity and DRX cycle are defined differently in the number and value that can be selected, by defining a 1:1 mapping relationship between monitoring periodicity and DRX cycle in the search space set configuration, it can be defined that each monitoring periodicity selectable in the search space set configuration means each DRX cycle in the DRX configuration. Or, in a simple way, it is assumed that the monitoring periodicity of the WUS search space set is the same as the associated DRX cycle, and it may be defined that only the offset from the on-duration start point is indicated in "IotPeriodicityAndOffset" of the search space set configuration. In this way, it is possible to designate the monitoring periodicity for the WUS DCI at a certain distance from the on-duration of the DRX cycle.

<Skip WUS Monitoring>

If the WUS monitoring occasion is more than a certain distance away from the DRX on-duration, an inefficient operation such as performing unnecessary wake-up for WUS monitoring and performing a sleep operation again for a predetermined time until on-duration when a WUS is detected may occur.

In the present disclosure, in order to alleviate this inefficiency, when the WUS monitoring occasion is apart from the associated DRX on-duration for a predetermined time (a certain time) or more, it is proposed to skip (omit) WUS monitoring. Here, since skipping PDCCH monitoring in on-duration associated with the skipped monitoring occasion may increase delay (latency), wake-up and PDCCH monitoring may be performed in on-duration associated with the skipped monitoring occasion. In this case, the time interval for determining whether to skip may be predefined or may be indicated by the network (e.g., through higher layer signaling, etc.).

The UE may follow the existing DRX operation if the WUS monitoring occasion is not valid or if there is no WUS monitoring occasion other than the active time.

Figure 16:
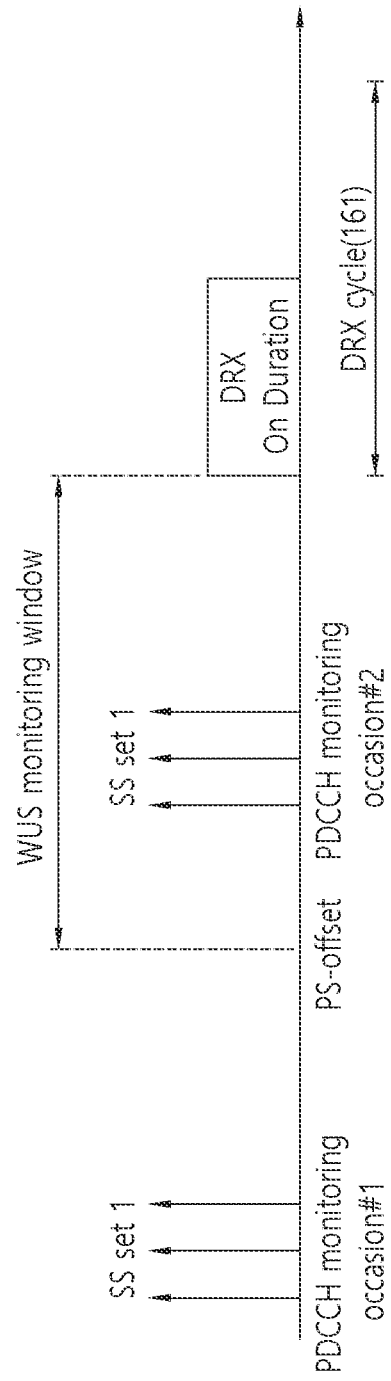
FIGS. 16 and 17 illustrate a case in which an occasion for WUS monitoring is located in the WUS monitoring window and a case in which it is not.
Figure 17:
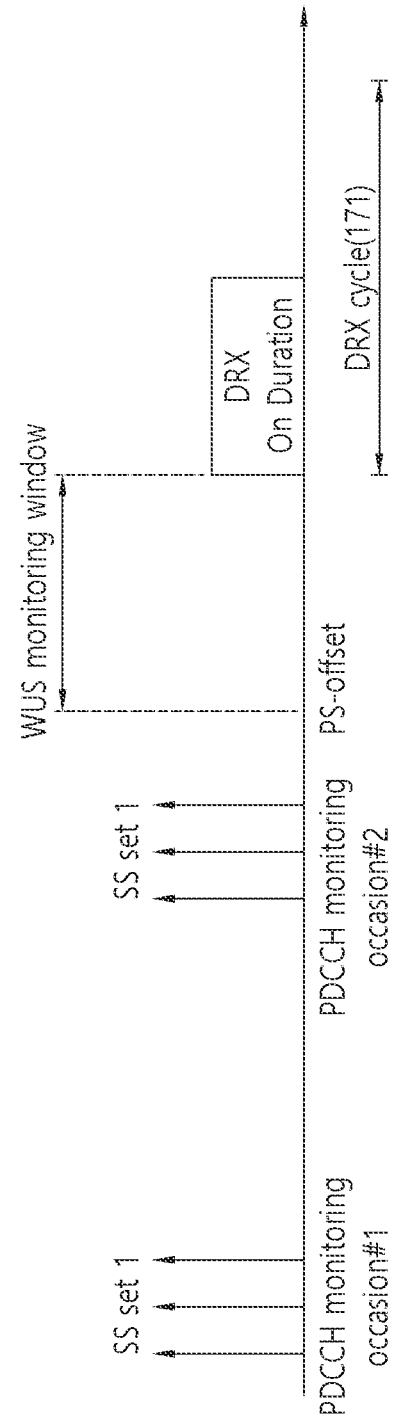

FIGS. 16 and 17 illustrate a case in which an occasion for WUS monitoring is located in the WUS monitoring window and a case in which it is not.

Referring to FIG. 16, for example, a plurality of PDCCH monitoring occasions (i.e., PDCCH monitoring occasions #1 and 2) for WUS detection may be configured for the UE. When a WUS is detected in these PDCCH monitoring occasions, an operation based on the WUS may be performed in the next DRX cycle 161. In this sense, the PDCCH monitoring occasions can be said to be related to (associated with) the next DRX cycle 161.

Meanwhile, among the plurality of PDCCH monitoring occasions, PDCCH monitoring occasion #2 is located within the WUS monitoring window, and PDCCH monitoring occasion #1 is located outside the WUS monitoring window. Therefore, the UE performs PDCCH monitoring for WUS detection only on PDCCH monitoring occasion #2.

On the other hand, in FIG. 17, a plurality of PDCCH monitoring occasions (i.e., PDCCH monitoring occasions #1 and 2) configured for the UE for WUS detection are all located outside the WUS monitoring window. In this case, it can be expressed that the UE does not have a PDCCH monitoring occasion for WUS detection outside (before) the next DRX on duration (or active time). In this case, the UE does not perform WUS monitoring.

However, when the UE does not perform WUS monitoring because it does not have a PDCCH monitoring occasion for WUS detection outside (before) the next DRX on duration (or active time), a problem arises as to which operation the UE should perform in the next DRX ON duration.

In the present disclosure, when a search space set is provided so that the UE monitors the PDCCH for detection of DCI format 2_6 (WUS signal) in the active DL BWP of PCell or SpCell, and the UE does not have any PDCCH monitoring occasion for detection of DCI format 2_6 outside the active time of the next DRX cycle, it is proposed that the UE wakes up, starts 'drx-onDurationTimer' in the next DRX cycle, and performs PDCCH monitoring.

Figure 18:
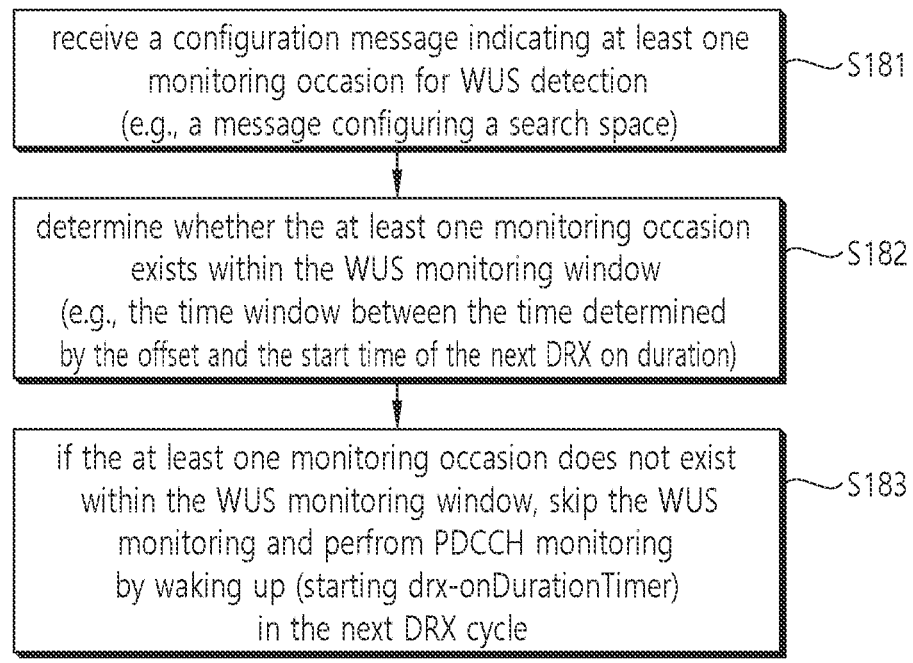
FIG. 18 illustrates a PDCCH monitoring operation method of a UE according to an embodiment of the present disclosure.

FIG. 18 illustrates a PDCCH monitoring operation method of a UE according to an embodiment of the present disclosure.

Referring to FIG. 18, the UE receives a configuration message indicating at least one monitoring occasion for WUS detection (e.g., a message configuring a search space) (S181). The WUS may be downlink control information (DCI) including a wake-up indication.

The UE determines whether the at least one monitoring occasion exists within the WUS monitoring window (e.g., the time window between the time determined by the offset and the start time of the next DRX on duration) (S182), if the at least one monitoring occasion does not exist within the WUS monitoring window, the WUS monitoring is skipped, PDCCH monitoring is performed by waking up (starting drx-onDurationTimer) in the next DRX cycle (S183). For example, if the at least one monitoring occasion is located a predetermined time before the start time of the next DRX on duration, PDCCH monitoring is performed in the next DRX On duration.

If the at least one monitoring occasion is located within the predetermined time from the start time of the next DRX-on duration, monitoring for the WUS detection is performed. On the other hand, if the at least one monitoring occasion is located before the predetermined time from the start time of the next DRX-on duration, monitoring for the WUS detection is not performed and PDCCH monitoring is performed by waking up at the start time of the next DRX-on duration.

The network (base station) may provide a message indicating the predetermined time to the UE.

Figure 19:
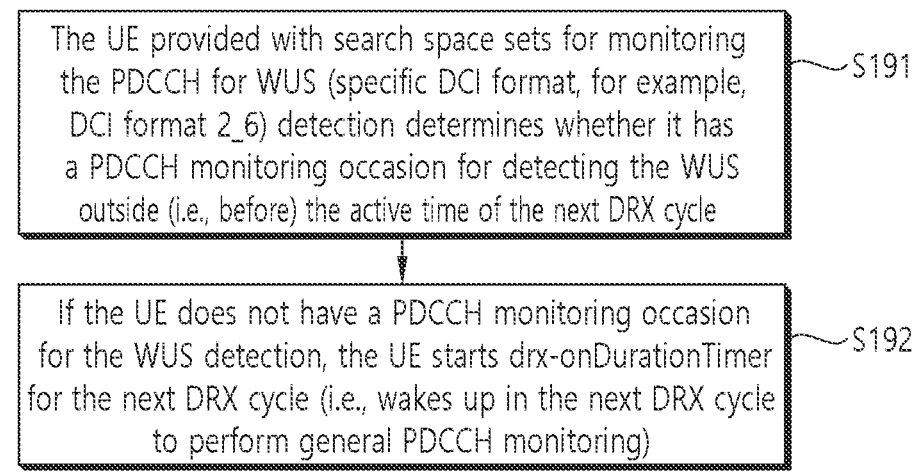

FIG. 19 shows a specific example to which FIG. 18 is applied.

Referring to FIG. 19, the UE provided with search space sets for monitoring the PDCCH for WUS (specific DCI format, for example, DCI format 2_6) detection determines whether it has a PDCCH monitoring occasion for detecting the WUS outside (i.e., before) the active time of the next DRX cycle (S191).

If the UE does not have a PDCCH monitoring occasion for the WUS detection, the UE starts drx-onDurationTimer for the next DRX cycle (i.e., wakes up in the next DRX cycle to perform general PDCCH monitoring) (S192).

From the side of the base station, the processor of the base station transmits a configuration message informing of at least one monitoring occasion for detecting a wake up signal (WUS), if the at least one monitoring occasion is located before a predetermined time from the start time of the next discontinuous reception (DRX)-on duration, the PDCCH may be transmitted in the next DRX-on duration.

Meanwhile, some exceptional examples in which PDCCH cannot be monitored (e.g., collision with SSB, rate matching resources (e.g., LTE CRS) and resources configured as uplink by DCI format 2_0) may be defined. If the resource configured for PS-PDCCH monitoring outside of the active time overlaps with the above-mentioned exceptional example, the UE cannot monitor the PS-PDCCH. In this case, a fallback operation must be defined, and the possible fallback operations can be as follows. That is, PS-PDCCH monitoring is skipped, but PDCCH monitoring may be performed in the corresponding DRX on-duration. If the resource for PS-PDCCH monitoring is not available, the UE monitors the configured PDCCH at the active time.

Figure 20:
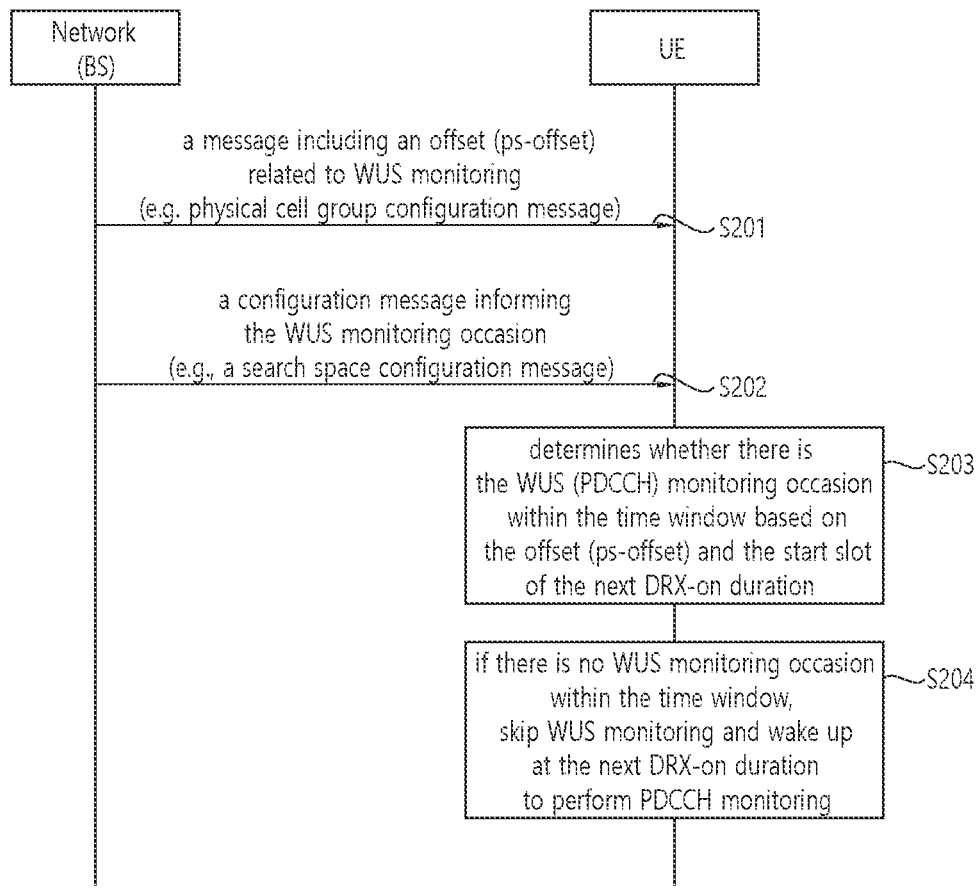
FIG. 20 shows an example of applying the method described in FIGS. 18 and 19 between a network and a UE.

FIG. 20 shows an example of applying the method described in FIGS. 18 and 19 between a network and a UE.

Referring to FIG. 20, a network (e.g., a base station) provides a message including an offset (ps-offset) related to WUS monitoring to the UE (S201). For example, the base station may inform the WUS monitoring-related offset (ps-offset) through a 'physical cell group configuration' message used to configure cell-group specific physical layer (L1) parameters. The offset may indicate a start time of the search of DCI format 2_6 with CRC scrambled by PS-RNTI.

The network provides a configuration message (e.g., a search space configuration message) informing the UE of the WUS monitoring occasion (S202).

The UE determines whether there is the WUS (PDCCH) monitoring occasion within the time window (the aforementioned WUS monitoring window) based on the offset (ps-offset) and the start slot of the next DRX-on duration (S203), if there is no WUS monitoring occasion within the time window, the UE skips WUS monitoring and wakes up at the next DRX-on duration to perform PDCCH monitoring (S204).

When the WUS monitoring occasion is more than a certain distance away from the DRX on duration, WUS monitoring may be unnecessary depending on the rate of change in the channel environment or the type of service. To perform WUS monitoring in the above case, it is necessary to perform an unnecessary wake up, when the WUS is detected, it may be inefficient, such as it may be necessary to perform a sleep operation again for a predetermined time until the DRX on duration. In the present disclosure, in order to alleviate this inefficiency, when the WUS monitoring occasion is spaced apart from the associated DRX on-duration for a predetermined time or more, it is proposed to skip WUS monitoring and to perform PDCCH monitoring (for general DCI format) in DRX on-duration associated with the skipped WUS monitoring occasion. This is because if the PDCCH monitoring is skipped, latency may increase.

<Determination of Monitoring Occasion for WUS Considering DRX Cycle/Type>

In NR, the DRX operation may comprise short DRX, long DRX, etc. (When both short/long DRX are configured) Short DRX performs DRX operation with a relatively short cycle compared to long DRX. If the PDCCH is not continuously detected in the short DRX, an operation in which the long DRX is applied is performed.

When this DRX operation is linked with the WUS operation, for all DRX types and/or for a short DRX cycle, monitoring for WUS DCI may act as overhead due to WUS transmission and reception and overhead in terms of WUS detection/decoding of the UE, the power savings gain can also be severely reduced. In addition, when both short/long DRX having different DRX cycles are configured and the WUS monitoring occasion is determined by the existing search space set configuration, depending on the DRX type, a problem may occur that the location of the monitoring occasion is not constant. In order to solve this problem, the present disclosure proposes to apply different WUS monitoring configurations according to the DRX type and/or cycle, the following method can be considered. The methods below may be implemented alone or in combination. In addition, the WUS monitoring configuration below may include the offset method and the search space set configuration suggested above.

Method 1) DRX Type Specific WUS Monitoring Configuration

The network may indicate different WUS monitoring configuration according to the DRX type. For example, a WUS monitoring configuration for a long DRX operation and a WUS monitoring configuration for a short DRX operation may be separately indicated (In this case, the WUS monitoring configuration may include not only the location of the WUS monitoring occasion but also configurations related to WUS monitoring, such as the number of WUS monitoring occasions). The UE may select and apply the WUS monitoring configuration based on the currently applied DRX type. For example, the network does not indicate WUS monitoring configuration for short DRX and does indicate WUS monitoring configuration only for long DRX. In this case, the UE always performs PDCCH monitoring in the on-duration within the short DRX interval and, in the long DRX interval, WUS detection is performed according to the indicated WUS monitoring configuration.

And when a WUS is detected, PDCCH monitoring may be performed in the associated on-duration.

When applying the monitoring occasion determination method proposed above to method 1, the network may indicate an offset for defining a WUS monitoring occasion for each DRX type or indicate a search space set configuration. In this case, the WUS monitoring configuration may include always monitoring the PDCCH without WUS monitoring or performing a sleep operation in a specific DRX cycle without WUS monitoring.

In order to additionally reduce signaling overhead and reduce the complexity of UE operation, in the short DRX operation, a method of performing PDCCH monitoring without performing WUS monitoring regardless of whether WUS is configured (or without configuring WUS) may be considered.

Method 2) DRX Cycle Specific WUS Monitoring

When the DRX cycle is short (for example, a DRX cycle of less than 10 ms), since a relatively short period is configured for on-duration within the corresponding DRX cycle, performing WUS monitoring every DRX cycle may be negative in that the power saving effect is low and the complexity of the UE due to WUS monitoring may increase. Therefore, the present disclosure suggests that the WUS monitoring operation performed according to the DRX cycle be configured differently.

In the simplest way, when a DRX cycle smaller than that value is configured by specifying a specific value (e.g., 10 ms) among DRX cycles, a method of performing PDCCH monitoring in on-duration without WUS monitoring may be considered. In this case, the specific value may be predefined or indicated by a network.

As another method, different WUS monitoring configurations may be indicated for each DRX cycle duration. In this case, the WUS monitoring configuration may include not only the location of the WUS monitoring occasion but also configurations related to WUS monitoring, such as the number of WUS monitoring occasions. For example, by specifying a specific value (e.g., 10 ms) among the DRX cycles, a WUS monitoring configuration for a DRX cycle smaller than the corresponding value and a WUS monitoring configuration (e.g. the use of offsets and/or search space set configuration) for a DRX cycle larger than the corresponding value may be indicated, respectively. And the UE may apply the indicated WUS monitoring configuration according to the configured DRX cycle.

Additionally, in order to reduce signaling overhead and reduce the complexity of UE operation, in the DRX operation in which a DRX cycle smaller than a specific value is configured, a method of performing PDCCH monitoring without performing WUS monitoring regardless of whether WUS is configured (or without configuring WUS) may be considered.

Figure 21:
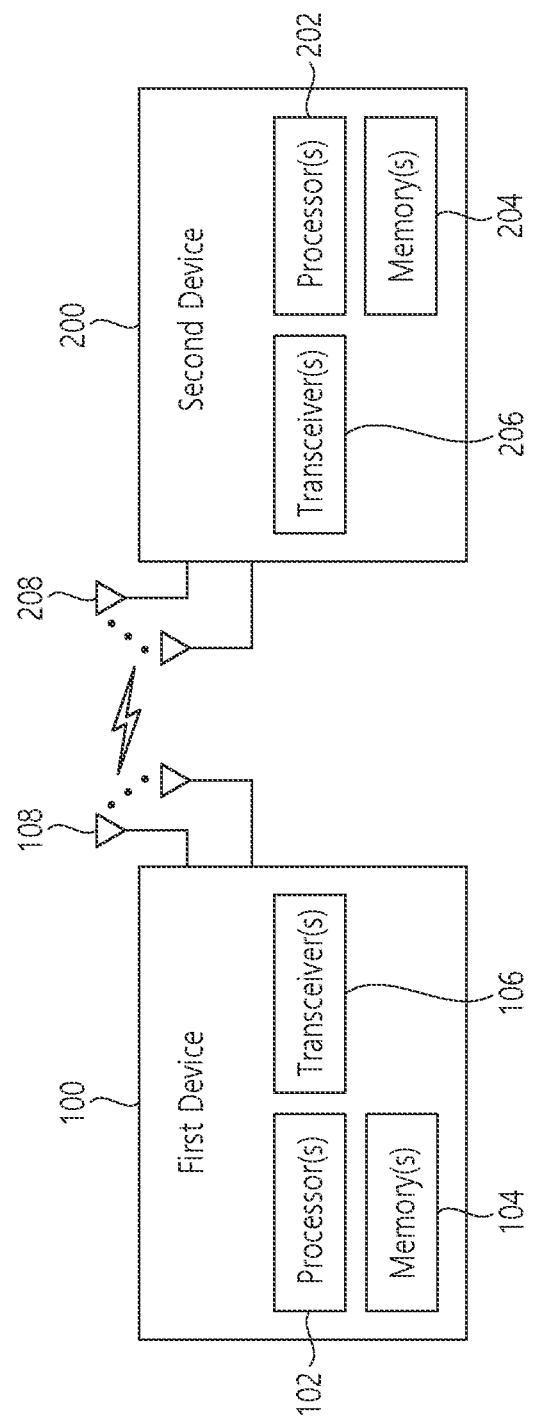
FIG. 21 illustrates a wireless device applicable to the present specification.

FIG. 21 illustrates a wireless device applicable to the present specification.

Referring to FIG. 21, a first wireless device 100 and a second wireless device 200 may transmit radio signals through a variety of RATs (e.g., LTE and NR).

The first wireless device 100 may include one or more processors 102 and one or more memories 104 and additionally further include one or more transceivers 106 and/or one or more antennas 108. The processors 102 may control the memory 104 and/or the transceivers 106 and may be configured to implement the descriptions, functions, procedures, proposals, methods, and/or operational flowcharts disclosed in this document. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processor 102 and may store a variety of information related to operations of the processor 102. For example, the memory 104 may store software code including commands for performing a part or the entirety of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit. In the present specification, the wireless device may represent a communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signals and then transmit radio signals including the third information/signals through the transceiver 206. In addition, the processor 202 may receive radio signals including fourth information/signals through the transceiver 106 and then store information obtained by processing the fourth information/signals in the memory 204. The memory 204 may be connected to the processor 202 and may store a variety of information related to operations of the processor 202. For example, the memory 204 may store software code including commands for performing a part or the entirety of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present specification, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The one or more processors 102 and 202 may be implemented with at least one computer readable medium (CRM) including instructions to be executed by at least one processor.

For example, each method described in FIGS. 18 to 20 may be performed by at least one computer-readable recording medium (CRM) including instructions based on being executed by at least one processor. The CRM may perform, for example, receiving a configuration message indicating at least one monitoring occasion for detecting a wake-up signal (WUS), if the at least one monitoring occasion is located a predetermined time before the start time of the next discontinuous reception (DRX)-on duration, performing PDCCH monitoring in the next DRX-on duration.

The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 22:
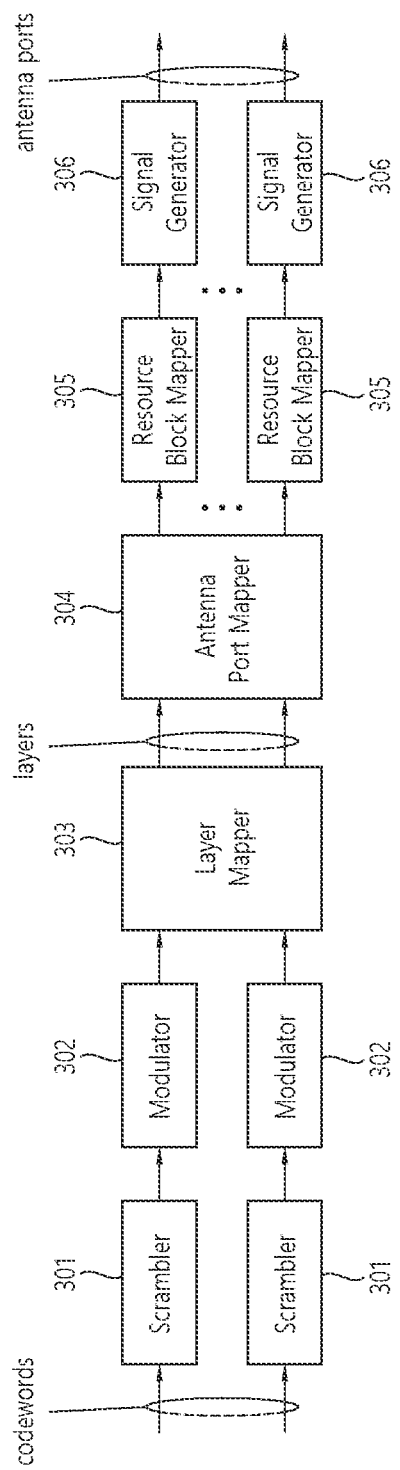
FIG. 22 shows an example of a structure of a signal processing module.

FIG. 22 shows an example of a structure of a signal processing module. Herein, signal processing may be performed in the processors 102 and 202 of FIG. 21.

Referring to FIG. 22, the transmitting device (e.g., a processor, the processor and a memory, or the processor and a transceiver) in a UE or BS may include a scrambler 301, a modulator 302, a layer mapper 303, an antenna port mapper 304, a resource block mapper 305, and a signal generator 306.

The transmitting device can transmit one or more codewords. Coded bits in each codeword are scrambled by the corresponding scrambler 301 and transmitted over a physical channel A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 23:
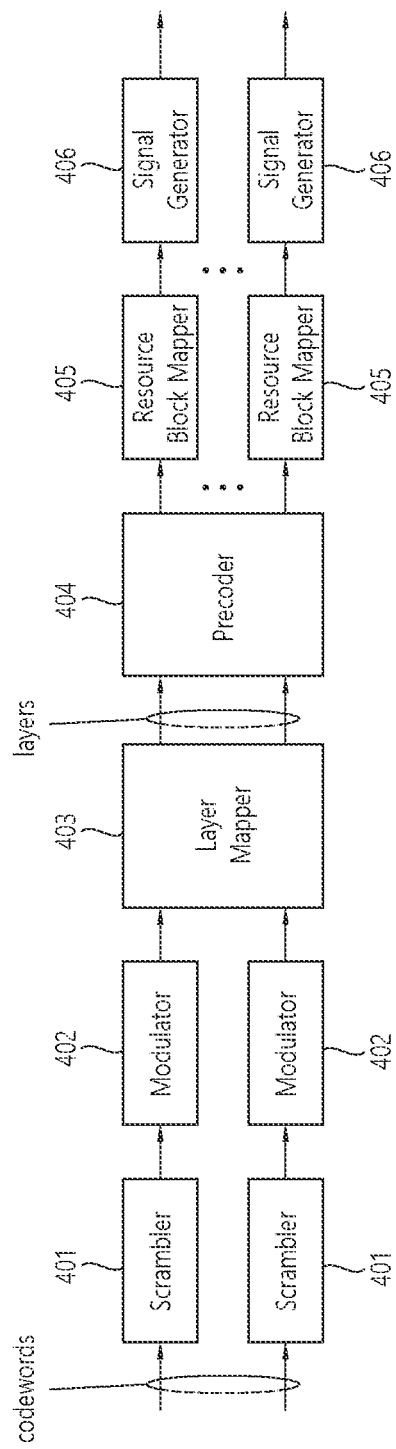
FIG. 23 shows another example of a structure of a signal processing module in a transmitting device.

FIG. 23 shows another example of a structure of a signal processing module in a transmitting device. Herein, signal processing may be performed in a processor of a UE/BS, such as the processors 102 and 202 of FIG. 21.

Referring to FIG. 23, the transmitting device (e.g., a processor, the processor and a memory, or the processor and a transceiver) in the UE or the BS may include a scrambler 401, a modulator 402, a layer mapper 403, a precoder 404, a resource block mapper 405, and a signal generator 406.

The transmitting device can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device may be reverse to the signal processing procedure of the transmitting device. Specifically, the processor of the transmitting device decodes and demodulates RF signals received through antenna ports of the transceiver. The receiving device may include a plurality of reception antennas, and signals received through the reception antennas are restored to baseband signals, and then multiplexed and demodulated according to MIMO to be restored to a data string intended to be transmitted by the transmitting device. The receiving device may include a signal restoration unit that restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit that removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 24:
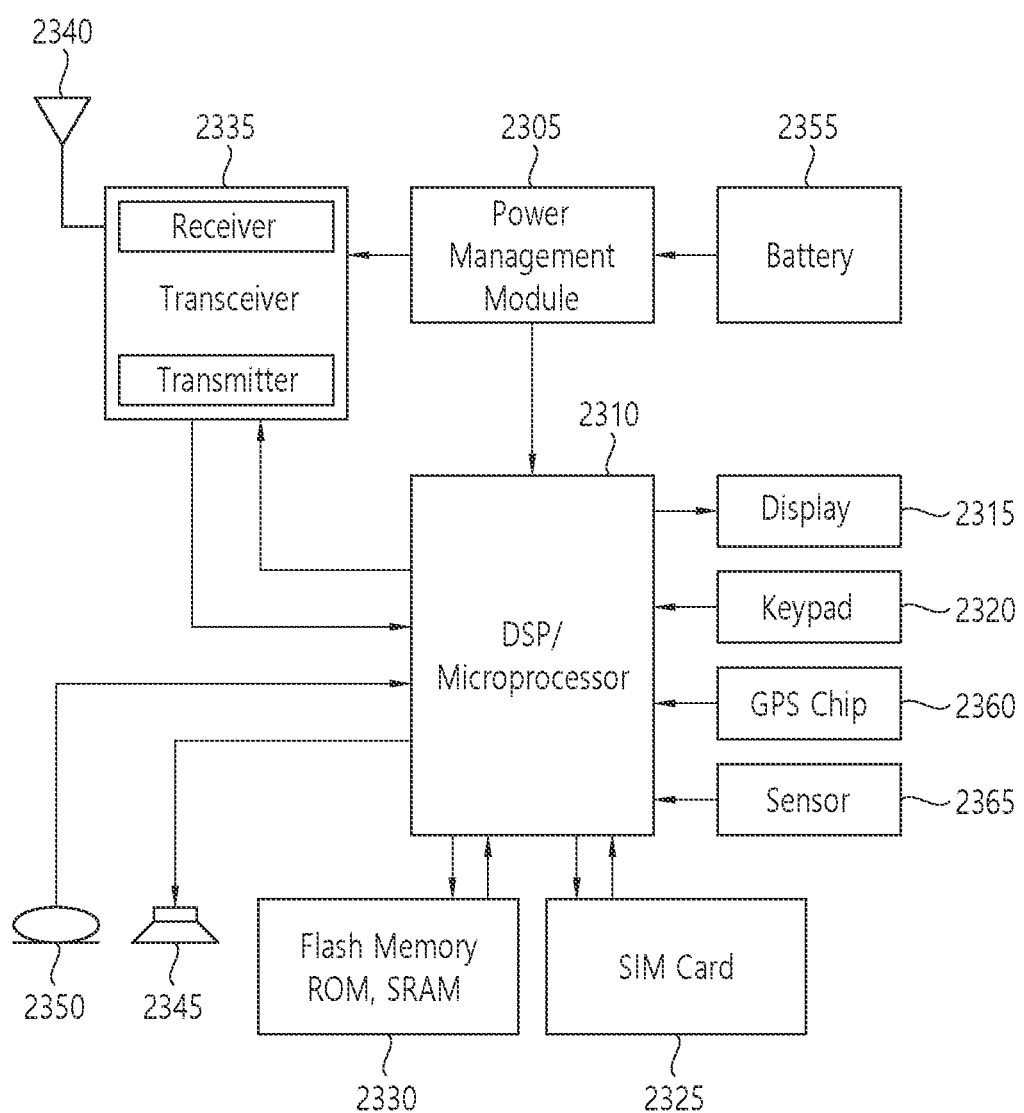
FIG. 24 illustrates an example of a wireless communication device for implementing the present disclosure.

FIG. 24 illustrates an example of a wireless communication device according to an implementation example of the present disclosure.

Referring to FIG. 24, the wireless communication device, for example, a UE may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 24 may be the processors 102 and 202 in FIG. 21.

The memory 2330 is connected to the processor 2310 and stores information related to operations of the processor. The memory may be located inside or outside the processor and connected to the processor through various techniques such as wired connection and wireless connection. The memory 2330 in FIG. 24 may be the memories 104 and 204 in FIG. 21.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 24 may be the transceivers 106 and 206 in FIG. 21.

Although not shown in FIG. 24, various components such as a camera and a universal serial bus (USB) port may be additionally included in the UE. For example, the camera may be connected to the processor 2310.

FIG. 24 is an example of implementation with respect to the UE and implementation examples of the present disclosure are not limited thereto. The UE need not essentially include all the components shown in FIG. 24. That is, some of the components, for example, the keypad 2320, the GPS chip 2360, the sensor 2365 and the SIM card 2325 may not be essential components. In this case, they may not be included in the UE.

Figure 25:
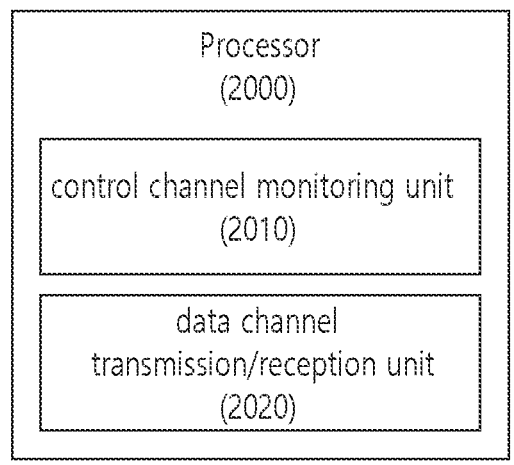
FIG. 25 shows an example of a processor 2000.

FIG. 25 shows an example of a processor 2000.

Referring to FIG. 25, the processor 2000 may include a control channel monitoring unit 2010 and a data channel receiving unit 2020. The processor 2000 may execute the methods (the position of the receiver) described with reference to FIGS. 18 to 20. For example, the processor 2000 may receive an offset based on the start slot of the discontinuous reception (DRX)-on duration and monitor the WUS in a time window between the time based on the offset and the start slot. If there is no WUS monitoring occasion within the time window, the WUS monitoring is skipped, but the PDCCH monitoring is performed by waking up at the next DRX-on duration. Thereafter, a PDSCH may be received (or a PUSCH transmitted) based on the PDCCH. The processor 2000 may be an example of the processors 102 and 202 of FIG. 21.

Figure 26:
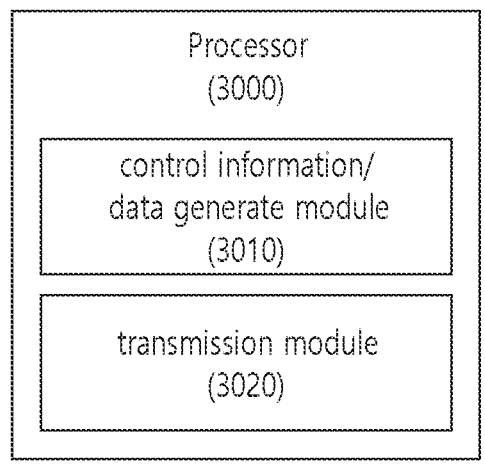
FIG. 26 shows an example of a processor 3000.

FIG. 26 shows an example of a processor 3000.

Referring to FIG. 26, the processor 3000 may include a control information/data generation module 3010 and a transmission module 3020. The processor 3000 may execute the methods described from the perspective of the transmitter in FIGS. 18 to 20. For example, the processor 3000 may generate an offset based on the start slot of the discontinuous reception (DRX)-on duration, and then inform the UE. In addition, the WUS monitoring occasion can be configured to the UE. WUS may be transmitted on at least one of WUS monitoring occasions. The processor 3000 transmits a PDCCH including scheduling information in Discontinuous reception (DRX)-on duration and based on the PDCCH, a PDSCH may be transmitted or a PUSCH may be received. The processor 3000 may be an example of the processors 102 and 202 of FIG. 21.

Figure 27:
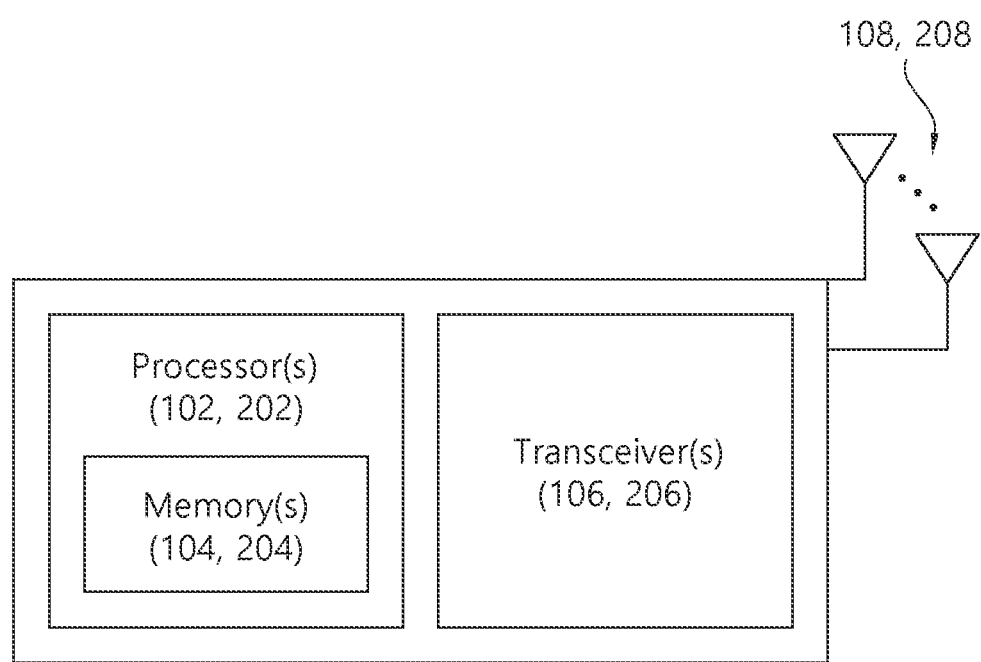
FIG. 27 shows another example of a wireless device.

FIG. 27 shows another example of a wireless device.

FIG. 27, a wireless device may include at least one processor 102 and 202, at least one memory 104 and 204, at least one transceiver 106 and 206, and one or more antennas 108 and 208.

The difference between the example of the wireless device described in FIG. 21 and the example of the wireless device in FIG. 27 is that, in FIG. 21, the processors 102 and 202 and the memories 104 and 204 are separated, in the example of FIG. 27, the processors 102 and 202 include the memories 104 and 204. That is, the processor and the memory may constitute one chipset.

Figure 28:
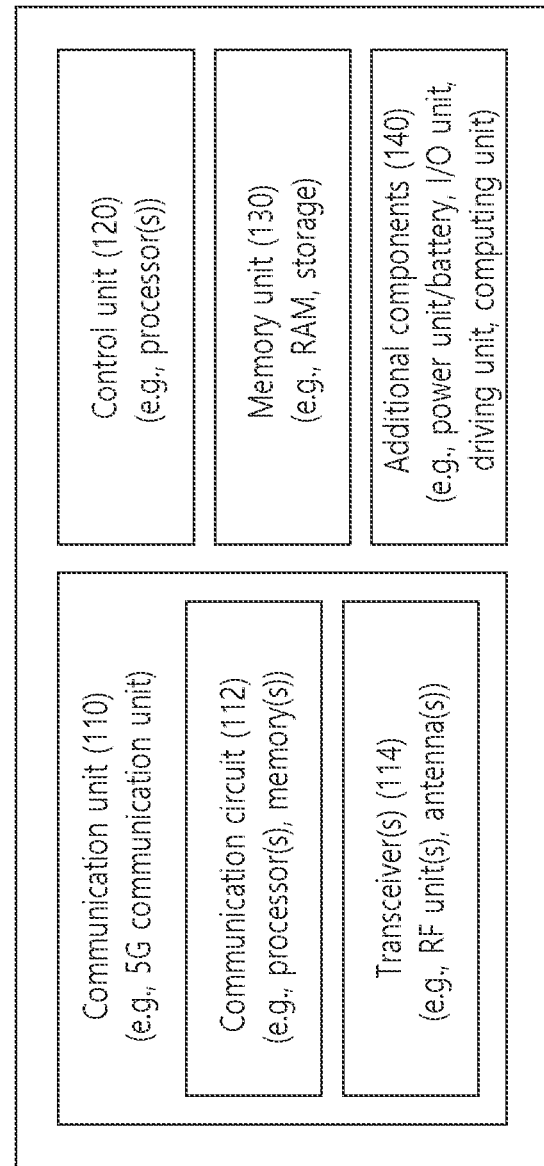
FIG. 28 shows another example of a wireless device applied to the present specification.

FIG. 28 shows another example of a wireless device applied to the present specification. The wireless device may be implemented in various forms according to a use-case/service.

Referring to FIG. 28, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 30), the vehicles (100b-1 and 100b-2 of FIG. 30), the XR device (100c of FIG. 30), the hand-held device (100d of FIG. 30), the home appliance (100e of FIG. 30), the IoT device (100f of FIG. 30), a digital broadcast terminal, a hologram device, a public safety device, an MTC device, a medicine device, a fintech device (or a finance device), a security device, a climate/environment device, the AI server/device (400 of FIG. 30), the BSs (200 of FIG. 30), a network node, etc. The wireless device may be used in a mobile or fixed place according to a use-example/service.

In FIG. 28, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. In addition, each element, component, unit/portion, and/or module within the wireless devices 100 and 200 may further include one or more elements. For example, the control unit 120 may be configured by a set of one or more processors. For example, the control unit 120 may be configured by a set of a communication control processor, an application processor, an Electronic Control Unit (ECU), a graphical processing unit, and a memory control processor. For another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 29:
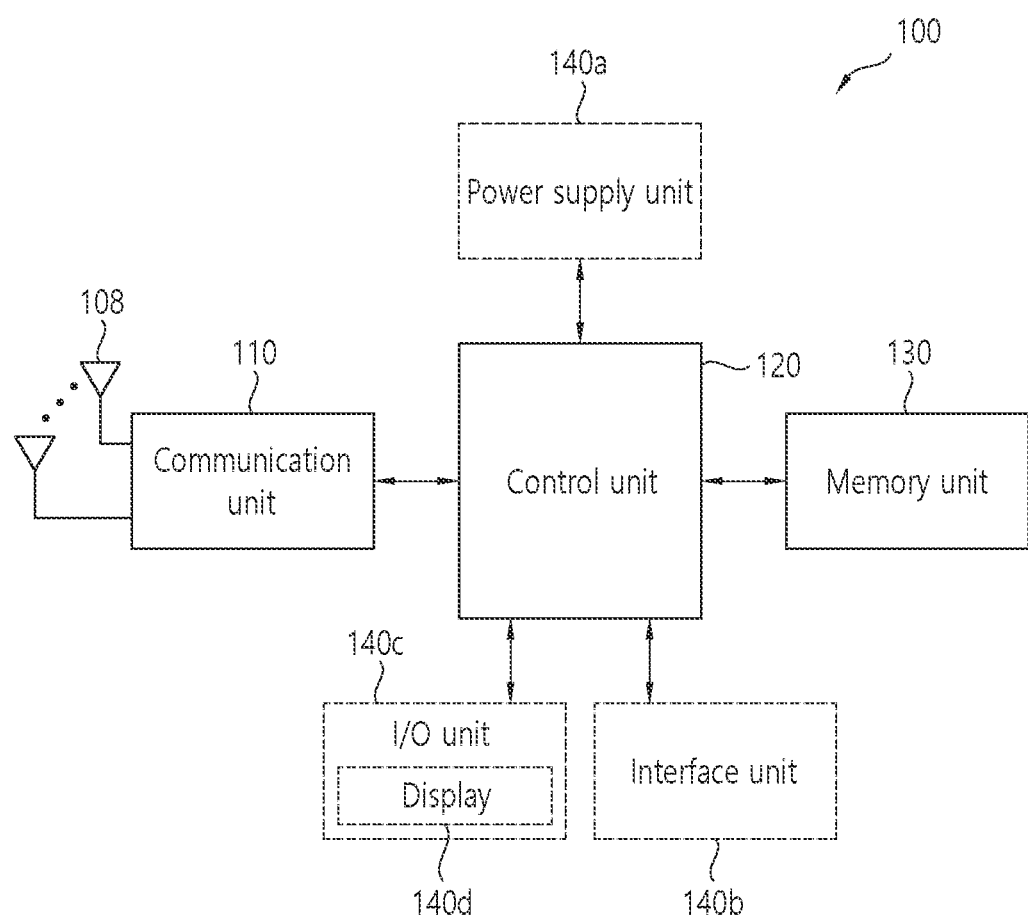
FIG. 29 illustrates a hand-held device applied to the present specification.

FIG. 29 illustrates a hand-held device applied to the present specification. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 29, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c respective correspond to the blocks 110 to 130/140 of FIG. 28.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

For example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. In addition, the communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 30:
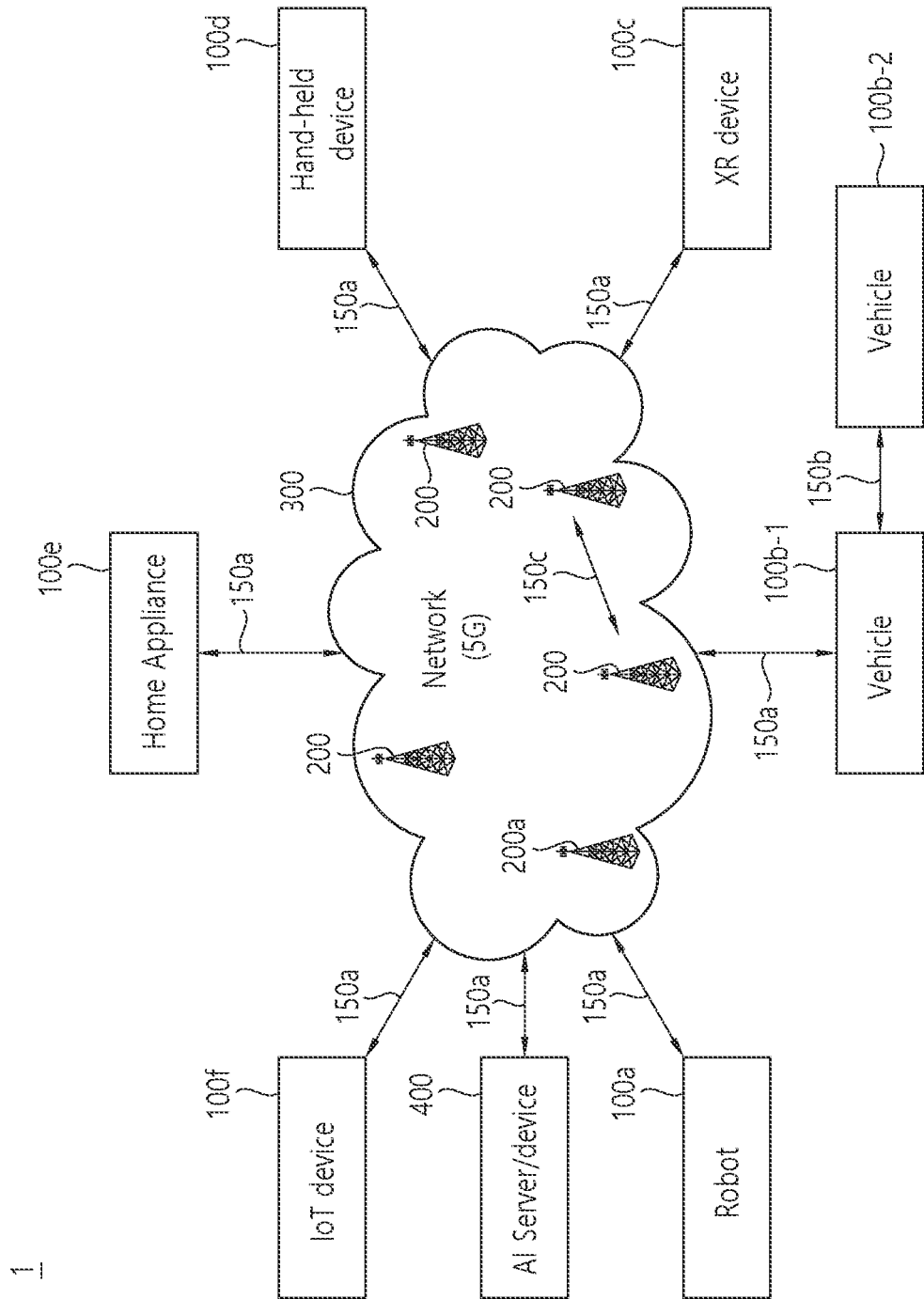
FIG. 30 illustrates a communication system 1 applied to the present specification.

FIG. 30 illustrates a communication system 1 applied to the present specification.

Referring to FIG. 30, a communication system 1 applied to the present specification includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, the NR supports multiple numerologies (or subcarrier spacing (SCS)) for supporting diverse 5G services. For example, if the SCS is 15 kHz, a wide area of the conventional cellular bands may be supported. If the SCS is 30 kHz/60 kHz, a dense-urban, lower latency, and wider carrier bandwidth is supported. If the SCS is 60 kHz or higher, a bandwidth greater than 24.25 GHz is used in order to overcome phase noise.

An NR frequency band may be defined as a frequency range of two types (FR1, FR2). Values of the frequency range may be changed. For example, the frequency range of the two types (FR1, FR2) may be as shown below in Table 7. For convenience of explanation, among the frequency ranges that are used in an NR system, FR1 may mean a "sub 6 GHz range", and FR2 may mean an "above 6 GHz range" and may also be referred to as a millimeter wave (mmW).

TABLE 7

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed. For example, as shown in Table 8 below, FR1 may include a band in the range of 410 MHz to 7125 MHz. That is, FR1 may include a frequency band of at least 6 GHz (or 5850, 5900, 5925 MHz, and so on). For example, a frequency band of at least 6 GHz (or 5850, 5900, 5925 MHz, and so on) included in FR1 may include an unlicensed band. The unlicensed band may be used for diverse purposes, e.g., the unlicensed band for vehicle-specific communication (e.g., automated driving).

TABLE 8

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 31:
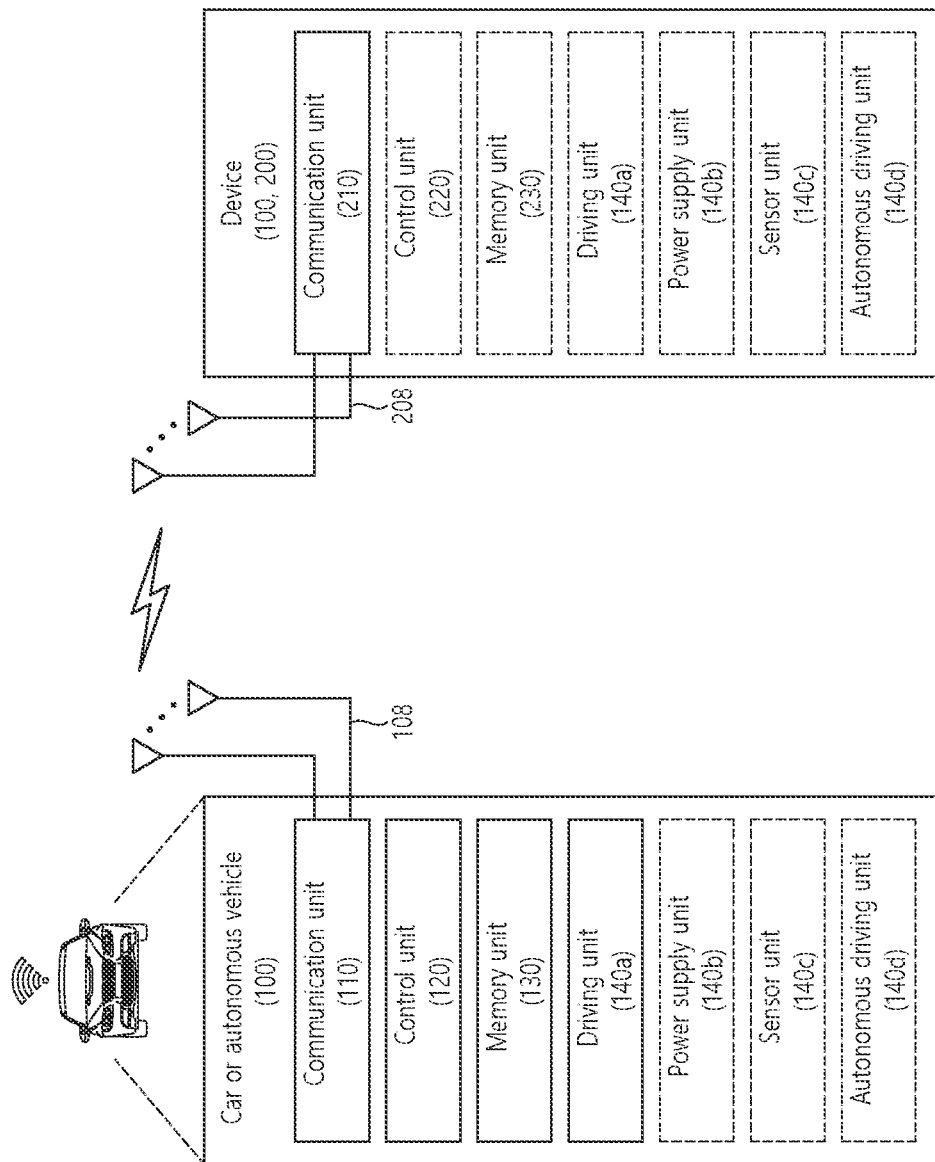
FIG. 31 illustrates a vehicle or an autonomous vehicle applicable to the present specification.

FIG. 31 illustrates a vehicle or an autonomous vehicle applicable to the present specification. The vehicle or autonomous vehicle may be implemented by a mobile robot, a car, a train, a manned/unmanned Aerial Vehicle (AV), a ship, etc.

Referring to FIG. 31, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d respectively correspond to the blocks 110/130/140 of FIG. 28.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method of operating a user equipment (UE) in a wireless communication system, the method comprising:
receiving a configuration message informing of monitoring occasions for detection of downlink control information (DCI) formats, wherein the DCI formats comprise a DCI format 2_6 including a wake-up indication;
based on at least one of the monitoring occasions being located within a time duration from a time indicated by an offset, where the UE starts monitoring a first physical downlink control channel (PDCCH) for detection of the DCI format 2_6, prior to a slot where a next discontinuous reception (DRX)-on duration timer would start, monitoring a second PDCCH for detection of a DCI format other than the DCI format 2_6 in a next DRX-on duration depending on a value for the wake-up indication of the DCI format 2_6 detected in the at least one of the monitoring occasions; and
based on the monitoring occasions not being located within the time duration, monitoring the second PDCCH for detection of the DCI format other than the DCI format 2_6 in the next DRX-on duration.

2. The method of claim 1, wherein monitoring for the detection of the DCI format 2_6 is performed based on the at least one of the monitoring occasions being located within the time duration.

3. The method of claim 1, wherein monitoring for the detection of the DCI format 2_6 is not performed based on the monitoring occasions not being located within the time duration.

4. The method of claim 1, wherein the configuration message is a high layer message for configuring a search space.

5. The method of claim 1, further comprising:
receiving a message informing of the offset.

6. A user equipment (UE), comprising:
a transceiver; and
a processor being operatively connected to the transceiver,
wherein the processor is configured to:
receive a configuration message informing of monitoring occasions for detection of downlink control information (DCI) formats, wherein the DCI formats comprises a DCI format 2_6 including a wake-up indication,
based on at least one of the monitoring occasions being located within a time duration from a time indicated by an offset, where the UE starts monitoring a first physical downlink control channel (PDCCH) for detection of the DCI format 2_6, prior to a slot where a next discontinuous reception (DRX)-on duration timer would start, monitor a second PDCCH for detection of a DCI format other than the DCI format 2_6 in a next DRX-on duration depending on a value for the wake-up indication of the DCI format 2_6 detected in the at least one of the monitoring occasions, and
based on the monitoring occasions not being located within the time duration, monitor the second PDCCH for detection of the DCI format other than the DCI format 2_6 in the next DRX-on duration.

7. The UE of claim 6, wherein monitoring for the detection of the DCI format 2_6 is performed based on the at least one of the monitoring occasions being located within the time duration.

8. The UE of claim 6, wherein monitoring for the detection of the DCI format 2_6 is not performed based on the monitoring occasions not being located within the time duration.

9. The UE of claim 6, wherein the configuration message is a high layer message for configuring a search space.

10. The UE of claim 6, wherein the processor is further configured to receive a message informing of the offset.

11. An apparatus operating in a wireless communication system, comprising:
a processor; and
a memory coupled with the processor,
wherein the processor is configured to:
receive a configuration message informing of monitoring occasions for detection of downlink control information (DCI) formats, wherein the DCI formats comprises a DCI format 2_6 including a wake-up indication;
based on at least one of the monitoring occasions being located within a time duration from a time indicated by an offset, where the apparatus starts monitoring a first physical downlink control channel (PDCCH) for detection of the DCI format 2_6, prior to a slot where a next discontinuous reception (DRX)-on duration timer would start, monitor a second PDCCH for detection of a DCI format other than the DCI format 2_6 in a next DRX-on duration depending on a value for the wake-up indication of the DCI format 2_6 in the at least one of the monitoring; and
based on the monitoring occasions not being located within the time duration, monitor the second PDCCH for detection of the DCI format other than the DCI format 2_6 in the next DRX-on duration.

12. The apparatus of claim 11, wherein monitoring for the detection of the DCI format 2_6 is performed based on the at least one of the monitoring occasions being located within the time duration.

13. The apparatus of claim 11, wherein monitoring for the detection of the DCI format 2_6 is not performed based on the monitoring occasions not being located within the time duration.

14. The apparatus of claim 11, wherein the configuration message is a high layer message for configuring a search space.

15. The apparatus of claim 11, wherein the processor is further configured to receive a message informing of the offset.

* * * * *